United States Patent [19]
Moss et al.

[11] Patent Number: 5,485,370
[45] Date of Patent: Jan. 16, 1996

[54] HOME SERVICES DELIVERY SYSTEM WITH INTELLIGENT TERMINAL EMULATOR

[75] Inventors: Leslie C. Moss; Carol A. Medine, both of Los Angeles; William Naylor, Topanga, all of Calif.

[73] Assignee: Transaction Technology, Inc., Santa Monica, Calif.

[21] Appl. No.: 112,178

[22] Filed: Aug. 25, 1993

Related U.S. Application Data

[63] Continuation-in-part of Ser. No. 104,931, Aug. 12, 1993, Pat. No. 5,321,840, and Ser. No. 84,319, Jun. 30, 1993, abandoned, which is a continuation of Ser. No. 433,825, Nov. 9, 1989, abandoned, said Ser. No. 104,931, is a continuation of Ser. No. 439,739, Nov. 21, 1989, abandoned, which is a continuation-in-part of Ser. No. 260,832, Oct. 21, 1988, Pat. No. 5,008,927, and Ser. No. 190,440, May 5, 1988, Pat. No. 4,991,199.

[51] Int. Cl.⁶ .................................................. G06F 15/30
[52] U.S. Cl. .............................. 364/408; 379/93; 379/96; 379/91; 364/401; 364/222.3; 364/918; 395/200.01
[58] Field of Search ....................... 364/DIG. 1, DIG. 2, 364/408; 379/93; 395/200

[56] References Cited

U.S. PATENT DOCUMENTS

| | | |
|---|---|---|
| Re. 34,034 | 8/1992 | O'Sullivan . |
| D. 202,110 | 8/1965 | Wann . |
| D. 211,253 | 6/1968 | Sundquist . |
| D. 227,482 | 6/1973 | Binks . |
| D. 244,617 | 6/1977 | Breger . |
| D. 282,165 | 1/1986 | Brown . |
| D. 282,927 | 3/1986 | Story et al. . |

(List continued on next page.)

FOREIGN PATENT DOCUMENTS

| | | |
|---|---|---|
| 0014313 | 8/1980 | European Pat. Off. . |
| 0181438 | 5/1986 | European Pat. Off. . |
| 0085482 | 10/1987 | European Pat. Off. . |
| 2309915 | 4/1975 | France . |
| 3212554 | 10/1963 | Germany . |
| 2632106 | 1/1978 | Germany . |
| 2709461 | 9/1978 | Germany . |

(List continued on next page.)

OTHER PUBLICATIONS

Bertsekas et al, Data Networks, 1987, p. 64.
"Reset Preventing System of Microprocessor", Japanese Publication No. vol. 112 (P-124) (990), Jun. 23, 1982.
"Special Section: The Telephone Becomes an Information Terminal", Computopia, May 1987, p. 41.
International Conference on Communications, Jun. 8–12, 1980, pp. 11.5.1–11.5.4.
B. A. Pargh Company Inc. Catalog, Dictograph–Dial–It–Portable Dialer, 1985–1986, p. 345.
B. A. Pargh Company Inc. Catalog, DEX–A–PHONE—Tray.

(List continued on next page.)

*Primary Examiner*—Kevin A. Kriess
*Assistant Examiner*—Lucien U. Toplu
*Attorney, Agent, or Firm*—Dale Curtis Hogue, Sr.; Marks & Murase

[57] ABSTRACT

Systems and methods provide communication between a user-friendly terminal, such as a "home terminal" shaped to resemble a conventional telephone, and a number of service provider computers such as financial institutions. The system's application software transforms simple user commands into commands understood by the service provider computers. The network host computer supplies messages to the terminal for generating prompts needed to solicit required information from the user, and communicates with the service computers according to their respective protocols. The invention provides a packet assembler and disassembler (PAD) element within the home terminal itself, allowing fast response time for the customer at the home terminal while retaining the benefits of data error entry error correction and data transmission error correction.

22 Claims, 12 Drawing Sheets

U.S. PATENT DOCUMENTS

| | | |
|---|---|---|
| D. 284,856 | 7/1986 | Marshall . |
| D. 288,808 | 3/1987 | Asaki et al. . |
| D. 299,030 | 12/1988 | Menn . |
| D. 303,522 | 9/1989 | Meda et al. . |
| D. 304,932 | 1/1987 | Oura et al. . |
| 2,541,270 | 2/1951 | Mitnick . |
| 2,593,475 | 4/1952 | Neilsen . |
| 3,515,814 | 6/1970 | Morgan . |
| 3,596,256 | 7/1971 | Alpert . |
| 3,652,795 | 3/1972 | Wolf et al. ............... 179/2 |
| 3,727,186 | 4/1973 | Stephenson . |
| 3,760,375 | 9/1973 | Irwin et al. . |
| 3,833,855 | 9/1974 | Gentile . |
| 3,852,571 | 12/1974 | Hall . |
| 3,865,994 | 2/1975 | Bender . |
| 3,932,709 | 1/1976 | Hoff et al. . |
| 3,938,090 | 2/1976 | Borison . |
| 3,956,615 | 5/1976 | Anderson . |
| 3,987,259 | 10/1976 | Larson . |
| 3,995,123 | 11/1976 | Wilson . |
| 4,023,013 | 5/1977 | Kinker . |
| 4,025,760 | 5/1977 | Trenkamp . |
| 4,032,931 | 6/1977 | Haker . |
| 4,071,697 | 1/1978 | Bushnell . |
| 4,075,460 | 2/1978 | Gorgens . |
| 4,091,448 | 5/1978 | Clausing . |
| 4,114,027 | 9/1978 | Slater . |
| 4,185,282 | 1/1980 | Pick . |
| 4,186,438 | 1/1980 | Benson et al. . |
| 4,277,837 | 7/1981 | Stuckert . |
| 4,291,198 | 9/1981 | Anderson et al. . |
| 4,291,199 | 9/1981 | Densmore et al. . |
| 4,301,337 | 11/1981 | Eventoff . |
| 4,313,176 | 1/1982 | Cecil . |
| 4,319,336 | 3/1982 | Anderson et al. ............... 364/900 |
| 4,334,126 | 6/1982 | Slingsby . |
| 4,341,951 | 7/1982 | Benton . |
| 4,381,427 | 4/1983 | Cheal et al. . |
| 4,409,450 | 10/1983 | Blades . |
| 4,423,294 | 12/1983 | Walser et al. . |
| 4,425,627 | 1/1984 | Eibner . |
| 4,431,870 | 2/1984 | May et al. . |
| 4,454,414 | 6/1984 | Benton . |
| 4,468,529 | 8/1984 | Samuel et al. . |
| 4,476,349 | 10/1984 | Cottrell et al. . |
| 4,481,574 | 11/1984 | DeFino et al. ............... 364/200 |
| 4,493,021 | 1/1985 | Agrawal . |
| 4,494,194 | 1/1985 | Harris et al. . |
| 4,503,288 | 10/1981 | Kessler . |
| 4,510,351 | 4/1985 | Costello et al. . |
| 4,532,378 | 7/1985 | Nakayama et al. . |
| 4,533,791 | 8/1985 | Read et al. . |
| 4,536,647 | 8/1985 | Atalla et al. . |
| 4,578,174 | 3/1986 | Kato et al. . |
| 4,578,537 | 4/1986 | Faggin et al. . |
| 4,580,011 | 4/1986 | Glaser . |
| 4,585,908 | 4/1986 | Smith . |
| 4,591,662 | 5/1986 | Legros et al. . |
| 4,604,686 | 8/1986 | Reiter et al. ............... 364/200 |
| 4,607,144 | 8/1986 | Carmon et al. . |
| 4,611,277 | 9/1986 | Kemppainen et al. . |
| 4,625,276 | 11/1986 | Benton et al. . |
| 4,629,832 | 12/1986 | Carson et al. . |
| 4,631,666 | 12/1986 | Harris et al. ............... 364/200 |
| 4,634,845 | 1/1987 | Hale et al. . |
| 4,639,917 | 1/1987 | Furuta . |
| 4,649,563 | 3/1987 | Riskin ............... 379/97 |
| 4,652,276 | 11/1986 | Benton . |
| 4,652,704 | 3/1987 | Franklin . |
| 4,653,086 | 3/1987 | Laube . |
| 4,659,876 | 4/1987 | Sullivan et al. . |
| 4,659,879 | 4/1987 | Hasegawa . |
| 4,663,766 | 5/1987 | Bremer . |
| 4,674,115 | 6/1987 | Kaleita et al. . |
| 4,682,014 | 7/1987 | Iwama . |
| 4,683,360 | 7/1987 | Maser . |
| 4,697,281 | 9/1987 | O'Sullivan . |
| 4,701,845 | 10/1987 | Andreasen et al. . |
| 4,710,955 | 12/1987 | Kauffman . |
| 4,714,989 | 12/1987 | Billings . |
| 4,724,521 | 1/1988 | Carron et al. . |
| 4,725,977 | 2/1988 | Izumi et al. . |
| 4,727,243 | 2/1988 | Savar . |
| 4,734,858 | 3/1988 | Schlafly . |
| 4,737,980 | 4/1988 | Curtin et al. . |
| 4,744,103 | 5/1988 | Dahlquist et al. . |
| 4,748,656 | 5/1988 | Gibbs et al. . |
| 4,754,326 | 6/1988 | Kram et al. ............... 364/900 |
| 4,788,657 | 11/1988 | Douglas et al. . |
| 4,796,297 | 1/1989 | Okamoto . |
| 4,797,914 | 1/1989 | Vaello . |
| 4,814,972 | 3/1989 | Winter et al. ............... 364/200 |
| 4,817,129 | 3/1989 | Riskin . |
| 4,823,264 | 4/1989 | Deming . |
| 4,839,919 | 6/1989 | Borges et al. . |
| 4,850,007 | 7/1989 | Marino . |
| 4,851,994 | 6/1989 | Toda et al. . |
| 4,852,127 | 7/1989 | Fraser et al. ............... 375/94 |
| 4,852,151 | 7/1989 | Dittakavi et al. . |
| 4,858,114 | 8/1989 | Health et al. . |
| 4,860,342 | 8/1989 | Danner . |
| 4,870,677 | 9/1989 | DiSanto . |
| 4,885,580 | 12/1989 | Noto et al. . |
| 4,885,765 | 12/1989 | Shirakawa . |
| 4,897,868 | 1/1990 | Engelke et al. . |
| 4,905,186 | 2/1990 | Fujui . |
| 4,926,325 | 5/1990 | Benton . |
| 4,933,971 | 6/1990 | Bestock . |
| 4,935,870 | 6/1990 | Burk, Jr. et al. ............... 364/200 |
| 4,943,995 | 7/1990 | Daudelin . |
| 4,951,278 | 8/1990 | Biber et al. ............... 370/60 |
| 4,956,852 | 9/1990 | Hodge . |
| 4,958,278 | 9/1990 | Meguro . |
| 4,972,457 | 11/1990 | O'Sullivan . |
| 4,972,463 | 11/1990 | Danielson et al. . |
| 4,982,430 | 1/1991 | Frezza et al. . |
| 4,991,133 | 2/1991 | Davis et al. ............... 364/900 |
| 4,991,199 | 2/1991 | Parekh et al. . |
| 4,995,074 | 2/1991 | Goldman et al. . |
| 5,008,927 | 4/1991 | Weiss et al. ............... 379/98 |
| 5,008,930 | 4/1991 | Gawrys et al. . |
| 5,012,512 | 4/1991 | Basso et al. . |
| 5,014,190 | 5/1991 | Johnson . |
| 5,018,189 | 5/1991 | Kurosawa et al. . |
| 5,020,100 | 6/1991 | Gardiner . |
| 5,025,373 | 6/1991 | Keyser, Jr. et al. . |
| 5,027,315 | 6/1991 | Agrawal . |
| 5,038,284 | 8/1991 | Kramer . |
| 5,038,372 | 8/1991 | Elms et al. . |
| 5,050,207 | 9/1991 | Hitchcock . |
| 5,058,000 | 10/1991 | Cox et al. ............... 364/200 |
| 5,060,152 | 10/1991 | Maeser et al. . |
| 5,065,309 | 11/1991 | Putnam et al. . |
| 5,065,425 | 11/1991 | Lecomte et al. . |
| 5,072,441 | 12/1991 | Szwarc ............... 370/60 |
| 5,077,788 | 12/1991 | Cook et al. . |
| 5,081,673 | 1/1992 | Engelke et al. . |
| 5,103,392 | 4/1992 | Mori . |
| 5,124,909 | 6/1992 | Blakely et al. . |
| 5,127,041 | 7/1981 | O'Sullivan . |
| 5,155,847 | 10/1992 | Kirouac et al. . |
| 5,164,982 | 11/1992 | Davis . |

| | | |
|---|---|---|
| 5,175,817 | 12/1992 | Adams et al. ............................ 395/200 |
| 5,185,742 | 2/1993 | Bales et al. ........................... 370/110.1 |
| 5,195,129 | 3/1993 | Yazawa et al. . |
| 5,195,130 | 3/1993 | Weiss et al. . |
| 5,218,680 | 6/1993 | Farrell et al. . |
| 5,220,501 | 6/1993 | Lawlor et al. .......................... 364/408 |
| 5,221,838 | 6/1993 | Gutman et al. . |
| 5,227,778 | 7/1993 | Vacon et al. ........................ 340/825.52 |
| 5,235,595 | 8/1993 | O'Dowd ................................. 370/94.1 |
| 5,245,651 | 9/1993 | Takashima et al. . |
| 5,249,218 | 2/1990 | Sainton . |
| 5,265,033 | 11/1993 | Vajk . |
| 5,274,810 | 12/1993 | Meldrum . |
| 5,276,529 | 1/1994 | Williams ................................ 358/406 |
| 5,347,632 | 9/1994 | Filepp et al. ........................... 395/200 |
| 7,688,170 | 8/1987 | Waite et al. . |
| B1 4,947,028 | 6/1993 | Gorog . |

FOREIGN PATENT DOCUMENTS

| | | |
|---|---|---|
| 3405448 | 11/1987 | Germany . |
| 54-15606 | 2/1979 | Japan . |
| 57-41723 | 9/1982 | Japan . |
| 63-136758 | 8/1988 | Japan . |
| 1324616 | 7/1973 | United Kingdom . |
| 1528691 | 9/1978 | United Kingdom . |
| 2128447 | 4/1984 | United Kingdom . |
| 2149946 | 6/1985 | United Kingdom . |
| 87/10256 | 2/1987 | WIPO . |
| PCT/US87/ 01560 | 7/1987 | WIPO . |
| 88/00371 | 1/1988 | WIPO . |
| 90/06517 | 5/1991 | WIPO . |

OTHER PUBLICATIONS

"The Programmable Gate Array Data Book", Xilinx, 1988, pp. 6–38 to 6–40.
"XC3000 Logic Cell Array Family", Xilinx no date, pp. 2–1 to 2–20 and 6–1 to 6–40.
"Understanding Telephone Electronics", Fike et al., 1989, Howard W. Sams & Co., pp. 119–150.
European Patent Application No. 85109734.5 filed Feb. 8, 1985.
PCT Application No. PCT/BR86/00015, International Filing Date Aug. 15, 1986.
"Computer Assisted Prior Art Searching" *Journal of the Patent Office Society*, Stephen A. Becker et al., vol. 65, No. 10, Oct. 1983 pp. 536–585.
"This Thing Has to Change People's Habits", Forbes, Jun. 26, 1989.
*American Banker*, Newman, Jun. 9, 1987, "8 Banks and Thrifts in 3 States Launch Video Banking Service", pp. 2 and 25.
*American Banker*, Sep. 22, 1982, "CompuServe Home Banking System Offered in Mass., Ohio", p. 9.
*American Banker*, Jul. 14, 1982, "New Jersey Shared ATM Network Will Offer Home Banking Service Through Video Test", p. 8.
*American Banker*, Mar. 19, 1982, "Electronic Networks Springing Up all Over: Systems Linking Automater Teller Machines, Point–of Sale Devices are Established or Contemplated in Several Areas of the Country", p. 2.
*American Banker*, Jul. 1983, "Home Bank System is Micro Friendly", p. 1.
*New Mexico Business Journal*, vol. 9, No. 6, "Electronic Banking Heads Toward a Cashless Society", s1, p. 19.
*Datamation*, vol. 32, Sep. 15, 1986, "Is Home Banking for Real?", p. 128.

*Communications of the ACM,* vol. 28, No. 8, Aug. 1985, "Case Study: The CIRRUS Banking Network", pp. 798–807.
*American Banker,* Apr. 11, 1984, Robert Garsson, "NBD Offers Electronic Highway for Network of Shared ATMs", p. 8.
*American Banker,* Tyson, Apr. 4, 1984, "Low–Cost Computer Terminal Designed for Home Banking", pp. 8 and 17.
*American Banker,* Aug. 12, 1985, "Viewtron Entering Pittsburgh in Deal with Dollar Bank, Pittsburgh Press", p. 6.
"Plessey Vutel" Plessey publication No. 7871/6/ 6/82 5M. 1983.
Xilinx "The Programmable Gate Arrays and Self–Diagnosing Hardware" 1989. pp. 6–54–6–56.
Citibank "FOL Automatic Download Using P86 Integrator" 1988.
ITS Current "ITS Develops SHAZAM Bill Payer for Consumer and Merchant Convenience" Mar., 1988. pp. 3–5.
Durkin, British Telecommunications Engineering "QWERTYphone—A Low Cost Integrated Voice/Data Terminal" vol. 5.
American Banker "Airline Credit Union Ready for Takeoff with Electronic and Telephone Banking" May 15, 1985, pp. 24, 91. (Abstract).
Economist "Over 100 Shared Automatic Teller Machine (ATM) Networks are Operating in the U.S." Mar. 27, 1982, pp. 83, 841. (Abstract).
American Banker "Home Banking: MCI Communications Venture to be Delayed Until Next Year" Jun. 28, 1984. pp. 2, 181 (Abstract).
Levy, Jay. The EFT Sourcebook "The Delicate Balance of ATM Industry Standards" 1988. pp. 35–50, Table 1–4.
"Electronic Apparatus", Japanese Publication No. vol. 3, No. 36 (P–103), Mar. 27, 1978.
"Intelligent Telephone", IBM Technical Disclosure Bulletin, vol. 23, No. 9, Feb. 1981.
"New Generation Microprocessor for Telecommunication Application", *Proceedings of the IEEE International Conference on Communication,* Subhash, Bal. 1980.
"SPCS Customer Premises Equipment Data Interface", Bellcore Technical Reference TR–SY000030, Issue 1, Nov. 1988.
"A New Generation of Information Terminals", CERMETEK, Apr. 23, 1987.
"Displayphone: Telephone and Terminal Combine in a Compact Desk–Top Unit", Adkins et al., Bell–Northern Research Ltd., 1982, pp. 2–7.
"Class Feature: Calling Number Delivery", Bellcore Technical Reference TR–SY000031, Issue 2, Jun. 1988.
"Plessey IBIS Videotex System", Plessey Publication No. 7952/1 9/1982 5M, 1982.
"Plessey Microphone", Plessey Publication No. 8232 4/1987 5M, 1987.
"Corporate Trade Payments: Hard Lessons in Product Design" *Economic Review* Federal Reserve Bank of Atlanta, vol. LXXI. No. 4, Apr. 1986, pp. 9–21.
"Managerial Leadership: A Key to Electronic Payment Success" *Economic Review* Federal Reserve Bank of Atlanta, vol. LXXI, No. 4, Apr. 1986, pp. 22–28.
"Scenarios for the Future of the ACH" *Economic Review* Federal Reserve Bank of Atlanta, vol. LXXI, No. 4, Apr. 1986, pp. 29–50.
"Electronic Payments at the Crossroads" *Economic Review Federal Reserve Bank of Atlanta, vol. LXXI. No. 3 Mar. 1986, pp. 20–33.*

"Desiderata for Viable ACH" *Economic Review* Federal Reserve Bank of Atlanta, vol. LXXI, No. 3, Mar. 1986, pp. 34–43).

"Dr. Frankenstein and the ACH" *Economic Review* Federal Reserve Bank of Atlanta, vol. LXXI, No. 4, Apr. 1986, pp. 4–8.

"The ACH: An Elusive Dream" *Economic Review* Federal Reserve Bank of Atlanta, vol. LXXI, No. 3, Mar. 1986, pp. 4–8.

"Electronic Payment Basics" *Economic Review* Federal Reserve Bank of Atlanta, vol. LXXI, No. 3 Mar. 1986, pp. 9–18.

"ACH Return Items" *Economic Review* Federal Reserve Bank of Atlanta, vol. LXXI, No. 3, Mar. 1986, p. 19.

"V–40–Based Single–Board Computer Technical Manual," Megatel Computer Corporation (1989).

"Discovering Direct Access," Citibank, N.A. (1987).

"HomeBase User Manual," Citibank N.A. (1984).

HOME SERVICES DELIVERY SYSTEM WITH INTELLIGENT TERMINAL EMULATOR

CROSS-REFERENCE TO RELATED APPLICATIONS

The present application is a continuation-in-part (CIP) of:
(A) Ser. No. 08/084,319, filed Jun. 30, 1993 abandoned (a file wrapper continuation of Ser. No. 433,825, filed Nov. 9, 1989, abandoned); and
(B) Ser. No. 08/104,931, filed Aug. 12, 1993 now U.S. Pat. No. 5,321,840 (a file wrapper continuation of Ser. No. 439,739, filed Nov. 21, 1989 abandoned), which is a continuation-in-part of both Ser. No. 260,832, filed Oct. 21, 1988, now U.S. Pat. No. 5,008,927, and Ser. No. 190,440, filed May 5, 1988, now U.S. Pat. No. 4,991,199.

The present application is related to U.S. patent application Ser. No. 593,921, filed Oct. 5, 1990, now U.S. Pat. No. 5,195,130, issued Mar. 16, 1993, which is a continuation-in-part of three prior patent applications, namely, (1) said Ser. No. 260,832, filed Oct. 21, 1988, now U.S. Pat. No. 5,008,927, (2) said Ser. No. 433,825, filed Nov. 9, 1989, and (3) said Ser. No. 439,739, filed Nov. 21, 1989. Said Ser. No. 260,832 is itself a continuation-in-part of said Ser. No. 190,440, filed May 5, 1988, now U.S. Pat. No. 4,991,199. The present application is also related to U.S. Pat. No. Des. 312,457 (Inatomi), which issued from patent application Ser. No. 380,557, filed Jul. 17, 1989.

All the foregoing patents and applications, as well as all patents and applications cited herein, are incorporated herein by reference as if reproduced in full below.

BACKGROUND OF THE INVENTION

1. Field of the Invention

The present invention relates generally to apparatus and methods for communication between a home network terminal microcomputer-based system and one or more computer networks providing information and financial and other services. The invention relates more particularly to apparatus and methods for conducting communications between a home computer system and a generally conventional computer network in an extremely simple manner, such that no knowledge of computer operations is necessary for the user of a home computer system to obtain information or perform financial and other transactions through the computer network.

2. Related Art

Developments in communications technology in the past decade have made it possible for consumers to access information stored on large computer systems through home microcomputers. It is well known that a home computer system can be used to communicate through standard telephone lines with large computer data bases storing such information as stock market statistics, airline flight schedules, and other useful consumer information.

However, there are several limitations to providing not only information services but also interactive financial services through a computer network to the home environment of the typical consumer. First, although technological advancements have created an unsurpassed standard of living for consumers in many aspects of everyday life, including communications, a corresponding limit on the level of consumer acceptance of technological innovations has arisen. Many consumers are reluctant to rely on technologically advanced devices which they cannot assimilate into the practices they have used previously and which they understand.

This consumer acceptance threshold has been encountered by home computer manufacturers who have experienced difficulty in convincing a substantial portion of the public of the advantages of having a home computer. In order to provide information services, and in particular relatively complex interactive financial services, in the home environment, the consumer must be convinced to incorporate some form of network terminal in his home. Typically, however, the steps necessary to establish communications between a home microcomputer and a remote computer data base require the consumer to have a familiar understanding of the home microcomputer. Although software packages are available that present a relatively "user-friendly" environment for the consumer to carry on network communications, a basic understanding of microcomputer operation is nevertheless required of the consumer. A majority of consumers do not have this fundamental knowledge, adding to consumer reluctance to use the technologically advanced products.

The microprocessor/telephone communication device disclosed in U.S. patent application Ser. Nos. 07/190,440 (Parekh et al.) and 260,832 (Weiss et al.), filed May 5, 1988, and Oct. 21, 1988 respectively, and in U.S. Pat. No. Des. 312,457 (from application Ser. No. 380,557) (Inatomi) filed Jul. 17, 1989, all of which are assigned to the assignee of the present application and are hereby incorporated by reference herein, provides a means for bringing technologically based services into the typical consumer's home despite consumer resistance to complex products. This breakthrough is accomplished by providing what is in reality a computer terminal resembling the familiar desktop telephone. The communication device of the invention provides easily understood information and instructions through a visual display "menu" to guide the user in using advanced telephone features and network services. The shift in emphasis from user-originated control to device-originated control in transactional operations assimilates the user into a technologically based marketplace of services which he would otherwise avoid.

Although a home terminal, such as the microprocessor/telephone of the Weiss et al. invention, provides the hardware necessary for network communications to the consumer in familiar form, the network communication methods available currently still present a technologically complicated procedure to the user of the home terminal. Those methods in the prior art which provide informational services to the consumer at home do so in a manner which requires some level of computer literacy on the part of the consumer user. Recognizing that this computer literacy requirement is a substantial impediment to bringing the technologically based informational and financial services to the general consumer, it is an object of the invention to provide a method for communicating between the home terminal and a computer network which controls communications so that the user need only read and respond to simple questions, that is, "prompts", presented on a display screen.

In the prior art, interactive communication methods have essentially provided only informational services to the home consumer. The necessary level of security, ease of use and reliable, quick information transmission required for a comparable home-based financial services system have not been achieved. Accordingly, it is another object of the present invention to provide financial services in addition to informational services to the consumer and in particular to provide a method of computer communication between the home terminal and a computer network so that the consumer can effect financial transactions through the system terminal in an easily understood fashion. For example, it is an object of the invention to provide a system whereby a user can determine his account balance, pay bills, transfer funds from one account to another, and the like, while in his home and in particular without requiring any computer literacy, and wherein the same system can be used to access other systems, such as databases, airline reservation systems, and the like.

Using current communication methods, communication between a home computer system and a computer network requires that the home computer system have a sufficient memory size to store application programs to control the communications. Each network, database, or the like to be accessed typically requires its own software, access codes, and related data which must be stored in the microcomputer memory. Accordingly, as more information and financial services are to be provided, the necessary application program memory requirement increases. At some point, the memory size requirement makes it impractical to place the home network terminal in the relatively small housing of a telephone. In particular, it is an object of the invention to avoid the requirement of a floppy disk or other bulky storage medium in the user terminal; if a physically larger computer system were used to accommodate the memory requirements, the advantage of consumer acceptance achieved by placing the microcomputer in a small housing with a limited number of keys made possible according to the Weiss et al. invention would be lost.

More particularly, it is desirable that the microcomputer necessary to carry out communication with the network computer be small enough to be integrated into a housing physically resembling that of a standard desktop telephone. The data storage capacity of such a miniature device is correspondingly small. Additionally, it is preferred to provide the consumer with as many various services as possible. Therefore, it is a further object of the invention to provide a method for providing required application programs from a network host computer to the user terminal as needed and in a rapid and efficient manner so that the consumer terminal can employ a plurality of application programs which could not be stored in a memory physically disposed within the telephone housing.

It is still another object of the invention to provide a method by which updated versions of the application programs can be downloaded to the microcomputer automatically each time the consumer connects to the network, thereby ensuring that out-of-date application programs are not used.

SUMMARY OF THE INVENTION

The present invention overcomes the drawbacks of the known systems and represents a significant advance in the art by providing user-friendly systems and methods for communicating with a plurality of informational and financial and other service computer systems through a microcomputer-based terminal, such as "home" terminal, so that a typical consumer having little expertise in computer operations can easily use the facilities of the service computer systems.

The communication method of the invention makes it possible for network communications to be performed through a home terminal which does not appear to the user to be technologically complex. The hardware used in performing the method of the present invention comprises a home terminal such as a telephone/microcomputer disclosed in U.S. Pat. No. 4,991,199 (D. Weiss et al.), and assigned to the assignee of the present application, which is incorporated by reference herein. The home terminal is thus a dedicated microcomputer which provides a simple input keyboard resembling the keypad of a conventional telephone and a visual display for communicating with the consumer.

In the home terminal of Weiss et al, a microcomputer resides within a standard desktop telephone and communicates with the consumer through a liquid crystal display (LCD) and a standard telephone keypad, both disposed on the top surface of the telephone. The home terminal comprises memory for storing data and programs and is interfaced to the telephone electronics so that it may also control the telephone in the conventional manner. In some embodiments, this device also comprises a keyboard including all of the alphabetic characters, which may slide out of the housing, without destroying its resemblance to a telephone. A modem is connected to the microcomputer within the home terminal for connecting the microcomputer through standard telephone lines to one or more remote computer systems, by way of a session controller which is comprised by a network host computer provided according to the invention.

In accordance with another aspect of the invention, there is provided a system for enabling a customer to interact with at least one service provider through at least one applications program related to the service provided by the at least one service provider. The system has a terminal including an input device, a display, and a packet assembler and disassembler (PAD) element. The system also has a terminal controller including means to execute the applications program and means for translating information between respective formats and respective communications protocols used by the PAD element and the service provider, to enable the customer to communicate with the service provider through the terminal.

The invention also provides a system for enabling a customer to interact with at least one service provider through at least one applications program related to the service provided by the at least one service provider. The system has a terminal including: 1) a customer input device having means for receiving input from the user and for convening the input into input signals, the input possibly having formatting errors; and 2) a packet assembler and disassembler (PAD) element, located substantially within the terminal and in communication with the customer input device. The PAD element includes means for receiving the input signals, for analyzing the input signals in accordance with input formatting rules which are related to the service provided by the service provider, and for providing local feedback signals in accordance with the analysis; and means, responsive to the input signals, for forming first packets of information in accordance with first formatting rules and a first communications protocol, and for transmitting the first packets of information which have no formatting errors or fewer formatting errors than the input signals. The terminal includes a display including means for receiving the local feedback signals and for displaying them to the customer. The system also has a terminal controller, located remotely from the terminal, and implemented on at least one computing device having means to execute the applications program. The terminal controller has a terminal interface controller including means for managing flow of packets of information into and out of the terminal controller in accordance with the first communications protocol, and means for translating the information in the first packets to a second format and a second communications protocol which are compatible with the service provider, so that the applications program forms commands for output to the service provider in accordance with the customer's input.

The invention further provides a system for enabling a user to interact with service computers which provide informational, financial and other services. The system has a network host computer having applications software in memory. The system also has a home terminal having a compact housing essentially configured as a telephone, the home terminal including a display for displaying prompts for controlling the operation of the home terminal, data input means, telephone electronics, computing means, memory; means to electronically connect and control the display, data input means, telephone electronics, computing means, and memory, to function as both a standard telephone and a general purpose computer; a modem to connect the home terminal computing to the host computer via a first telephone network; and means, including a packet assembler and disassembler (PAD) element, for managing message communication between the home terminal and the network host and for ensuring that data input through the data input means has been formatted for the network host applications software. The system also has means for accessing at least one of the service computers over a second telephone network in response to at least one message communicated from the home terminal over the first telephone network and through the network host computer, the at least one message indicating selection of a service in response to the prompts. In this system, the network host computer further includes means for controlling a communications session between the home terminal and at least one service computer over the first and second telephone networks, the communications session controlling means being controlled by instructions for translating messages between the home terminal and at least one service computer.

The invention further provides a method of providing a home terminal with the ability to use services provided by at least one service computer connected to the home terminal in a communications session managed by a host computer, wherein the home terminal has a display, a data input device, telephone electronics, computing electronics, a modem and software to operate the terminal as both a telephone and a general purpose computer. The method comprising the steps of initiating the communications session with the host computer using a packet assembler and disassembler (PAD) element in the terminal; sending messages to the terminal to prompt a customer to provide input to the terminal; imputing data through the data input device; locally analyzing the input data for conformance with format and content requirements, and displaying appropriate prompts and imputing additional data if the input data is not in conformance with the requirements; assembling the data input into message packets; establishing the communications session between the service computer and the home terminal; and controlling the communication session by translating messages between respective formats usable by the home terminal and the service computer, and by timing message flow.

BRIEF DESCRIPTION OF THE DRAWINGS

The invention will be better understood if reference is made to the accompanying drawings, in which FIGS. 1–10 are those present in Ser. No. 08/084,319, filed Jun. 30, 1993 (a file wrapper continuation of Ser. No. 433,825, filed Nov. 9, 1989), and in which

FIG. 1 shows a schematic overview of the system according to the invention.

FIG. 2 shows a diagram of the message format employed according to the invention.

FIG. 3 shows a detail of a status field of the message according to the invention.

FIG. 4 shows a connect message according to the invention.

FIG. 5 shows a connect response message according to the invention.

FIG. 6 shows a transaction message text format according to the invention.

FIG. 7 shows a page downloading message text format employed according to the invention.

FIG. 8 shows a page update request message according to the invention. and

FIG. 9 shows a response to the page update request message of FIG. 8.

FIG. 10 shows a schematic view of a distributive data processing system shown in FIG. 19 of U.S. Pat. No. 5,195,130.

FIG. 11 illustrates an alternative home services delivery system.

FIG. 12 illustrates an alternative embodiment of the home services delivery system of FIG. 11, in which the packet assembler and disassembler (PAD) is resident in the terminal 104 rather than in the terminal interface controller (TIC) 122.

FIG. 13 illustrates a typical physical arrangement of several terminal controllers.

FIG. 14 is a high-level block diagram of an application generation system (AGS) which may be used to develop and test applications programs for the home services delivery system.

FIG. 15 illustrates a typical local area network configuration for use with the application generation system according to the present invention.

FIG. 16 schematically illustrates components of the application data base, according to the FIG. 21 embodiment.

FIG. 17 illustrates the manner in which the application generation system provides different versions of applications programs, especially suitable for use in a variety of foreign languages.

FIG. 18 shows an example of a screen which shows a German version of an application program.

FIG. 19 illustrates a typical screen display generated by the application generation system to allow a developer to simulate hardware errors.

DETAILED DESCRIPTION OF THE PREFERRED EMBODIMENTS

Figure 1:
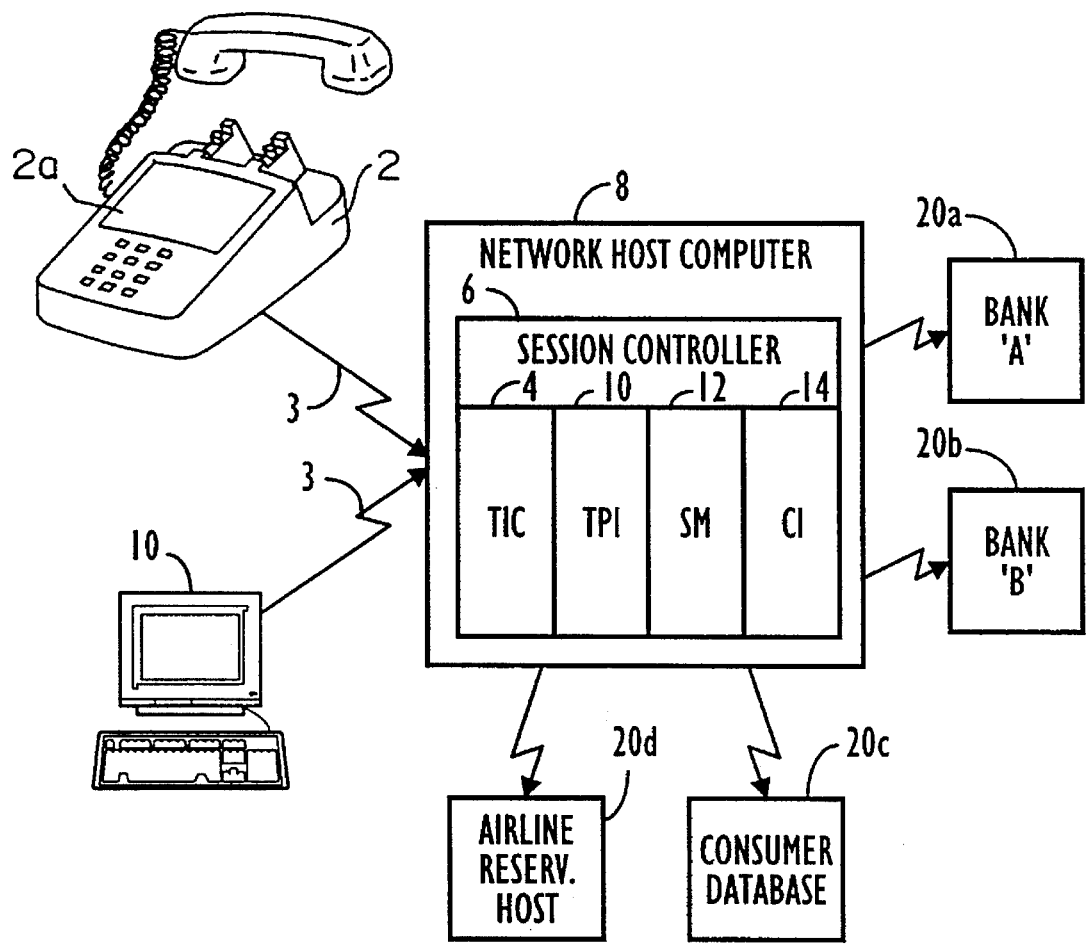

In describing preferred embodiments of the present invention illustrated in the drawings, specific terminology is employed for the sake of clarity. However, the invention is not intended to be limited to the specific terminology so selected, and it is to be understood that each specific element includes all technical equivalents which operate in a similar manner to accomplish a similar purpose.

As a background, FIGS. 1–10 are those present in Ser. No. 08/084,319, filed Jun. 30, 1993 (a file wrapper continuation of Ser. No. 433,825, filed Nov. 9, 1989). FIGS. 11–19 are added in the application being filed Aug. 25, 1993, with emphasis being placed on the embodiment in FIG. 12.

Referring to FIG. 1, the method of the present invention is performed through a home terminal 2 connected via a conventional telephone circuit 3 to a session controller 6, which may comprise both hardware and software, as understood by those of skill in the art, and which is resident in a network host computer system 8.

According to the invention, the home terminal 2 physically resembles a telephone with a display screen 2a, as described in the Weiss applications discussed above. However, certain aspects of the invention-may be applicable to more conventional microcomputer systems, as shown at 10: Indeed, according to one aspect of the invention described in Ser. No. 07/439,739 and FWC 08/104,931 (Ahlin et al.), the telephone-resembling user terminal 2 functionally mimics an IBM PC/XT microcomputer, such as computer 10, in certain aspects.

The session controller 6 provided according to the present invention serves as a link between the microcomputer 2 and/or 10 and a plurality of informational and financial service computer systems 20(a–d). As indicated, service computers 20(a–d) typically are themselves host computer systems such as bank computers, airline reservation computers, host computers running database access systems, etc., which conventionally respond to inquiries from remote systems. It would also be possible to physically provide the network host computer 8 as a part of one of the service computers 20(a–d). For example, the network host computer 8 might be physically configured as portion or a computer also serving as a bank service computer. The claims of this application are intended to include this possibility.

According to an important aspect of the invention, the function of the session controller 6 is to allow the user to conveniently employ the microcomputer resembling a telephone 2 as described in the Weiss et al application to access the remote service computers 20(a–d); notably, this is accomplished according to the invention without modifying the software of the service computers 20(a–d). Thus, an important function of the network host 8 and of the user terminal 2 and the HAL software which it runs is to cooperatively transform the highly simplified, "user-friendly" request/response sequence seen and responded to by the user into the relatively complex communication sequence normally used to access the service computers 20(a–d), and, conversely, to modify the specialized display sequence typically presented by the service computers 20(a–d) into an easily understood presentation.

More particularly, as is understood by those of skill in the art, each of the service computers 20(a–d) provides a different service, e.g., stock ticker information, airline reservations, bank transaction services, and a myriad of others. To access each of these services conventionally requires that the user have available one or more access codes, and that he has memorized the appropriate sequence of responses to "prompts". Each of theme sequences is different, and each conventionally requires some education.

For example, in a typical automatic teller machine transaction, the user is first required to insert a card which includes a user identification. He then is prompted to input an access code. The system correlates this with the identification provided by the card, to ensure that the user is duly authorized. He is then prompted to select a transaction, and an account. Depending on the transaction selected, various other options must be selected. All of the response sequences must be learned before the user can employ the system. By comparison, if using a legal research database, for example, an entirely different sequence of steps must be negotiated. Accordingly, the consumer must be separately educated with respect to each service he desires to use. Clearly, this represents a significant barrier to the wide acceptance and use of these systems.

By comparison, according to the invention, the network host 8 is interposed between the user terminals 2 and each service computer system 20(a–d). The network host 8 thus works in concert with the user terminals 2, in particular by supplying to the user terminal 2 one or more pages of HAL application software which "personalizes" the user terminal 2 to the service computer 20(a–d). The user terminal 2 is enabled by the application software to prompt the user to supply any information needed to access the service computer. The network host 8 then translates the user dam, received from the user terminal 2 in a first user terminal format, into whatever service computer communication format is required by the service computer 20(a–d) selected. Thus, the user sees an essentially similar selection of simple queries (e.g., "Input User Code", "Press 4 for Checking Account, 6 For Saving Account", "Press for Previous Screen", "Press to Authorize Auto Payment") regardless of the service he has selected. The "user-friendliness" thus provided by the network host and the user terminal of the invention in response to the user's selection of a particular service is very significant in achieving the objects of the invention.

For example, at any given time, the display 2a of the user terminal may include the user's last response (e.g. , in a banking transaction, "National Bank of Washington") the information being sought (e.g., "Select Account Desired"), and a list of prompts, indicating the choices available to the user by pressing a single button in the keypunch (e.g., "Press 1 for Savings, 2 for Checking, 3 for Money Market") as well as a series of help prompts also selectable by pressing a single button (e.g., "Hit * to Back Up, 0 to Start Over, # for More Choices").

According to an important aspect of the invention, these menu choices are varied in accordance with the service selected by the user. That is, the user-friendly interface, comprising a "tree" of new menus displayed sequentially and in response to each input provided by the user, until all information required to access the service has been specified, thus varies with the service. Provision of application programs page by page in response to the specification of a service according to the invention permits this flexibility, as it would be impractical to store all possible application programs in the user terminal.

The session controller 6 functionally comprises a terminal interface controller (TIC) 4, a terminal protocol interface (TPI) 10, a session manager (SM) 12, and a common integrator (CI) 14. The TIC 4 monitors the message flow between the home terminal 2 and the TPI 10 and controls timers to cause timeouts when message traffic ceases. This is important in ensuring that the terminal 2 properly provides the normal telephone functions. See the Weiss et al applications referred to above. The TPI 10 communicates with the home terminal 2 and translates the protocol used by the home terminal when first establishing a connection with the host network computer 8. Additionally, the TPI 10 generates random encryption key numbers when requested by the home terminal 2. These encryption key numbers are used by the terminal program to transmit confidential information. The TPI 10 also handles application page downloading requests.

The SM 12 maintains the essential data needed for each communication session by storing information relating to the user of the terminal 2 and the service computer system 20(a–d) which the user is accessing. All transactions performed between the home terminal 2 and the session controller 6 during a particular session occur within the context of the specific consumer and the service selected, e.g., his bank or other financial institution. For example, after the consumer has been successfully established as a valid and authorized user, all message traffic to the particular terminal is thereafter considered related only to that consumer. This context determination, based on the consumer identification information, then allows the network host computer 8 to access the correct service computer 20(a–d) for such items as account balances, and so on. The SM 12 stores the contextual information required to validate the transaction and inserts it in messages passed to the CI 14 when necessary. The SM 12 also serves as the interface between the TPI 10 and the CI 14, which in turn sexes as the communication link between the other elements of the session controller 6 and the service' computer systems 20(a–d).

According to the method of the present invention, the user accesses one particular service computer 20(a–d) by selecting the corresponding option, i.e. the desired service, from a menu displaying the possible choices on the LCD of his home terminal. Communication between the home terminal 2, the session controller 6 and the selected service computer 20(a–d) is then begun with a session establishment and protocol selection phase.

During the session establishment and protocol selection phase, the home terminal 2 connects to the network host computer 8 through a standard telephone line 3. After the connection has been established, the home terminal 2 sends a series of signals by which the session controller 6 sets such parameters as the communication baud rate. For example, after the network host computer 8 sets the communication baud rate, it responds with a terminal type inquiry. The home terminal 2 interprets this signal as a request to identify the type of terminal in use and responds with an ASCII code identifying the type of home terminal being used, i.e. a microcomputer/telephone 2 according to the Weiss invention, a standard microcomputer 10 employed conventionally to access the service computers, or some other remote terminal type.

During this session establishment phase the terminal 2 may also request the user to provide a personal serial number, to ensure that the user is in fact authorized to use the terminal. A terminal ID number may also be rehired to be included in some of the messages. The network host is capable of deleting either serial number from lists of validated serial numbers, so as to prevent users who become unauthorized (e.g. by failure to keep accounts current, etc.) from using the system.

According to the invention, the network host 8 provides the important function of allowing the home terminal 2 to mimic a conventional microcomputer 10 running essentially conventional communication software. Therefore, the service computer 20(a–d) receives communication in precisely the same "service computer communication protocol" which it conventionally receives. Accordingly, the service computers need not be modified in any way for communication according to the invention, which is essential to achieving the objects thereof. As indicated, such conventional microcomputer systems 10 may be also interfaced to the service computers 20(a–d) by way of the network host 8 according to the invention. In such case, the network host 8 will again respond to a request for access to a service computer 20(a–d) by downloading one or more "pages" of application software, user prompts, etc., allowing the conventional microcomputer 10 to conveniently access the service computer 20(a–d).

The manner in which the user terminal 2 is enabled to mimic a conventional microcomputer 10 for the purpose of communicating with the service computers 20(a–d) via the network host 8 is disclosed in detail in Ser. No. 07/439,739 and FWC 08/104,931 (Ahlin et al.).

Figure 2:
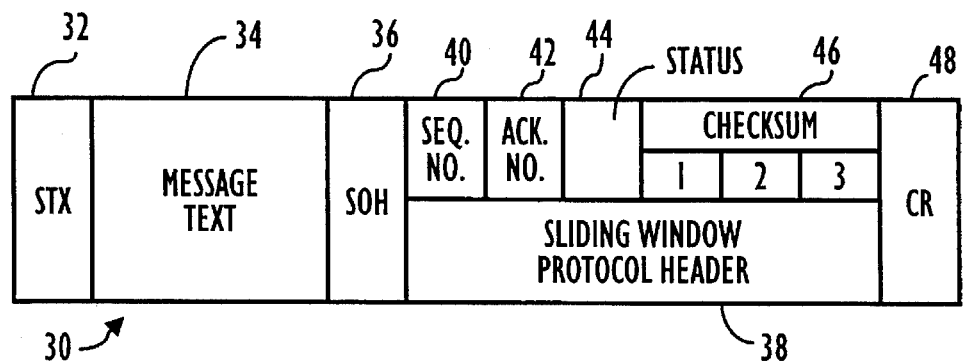

After a communication session has thus been established, a "link level" protocol is employed between the home computer and the session controller. In the link level protocol, all communications between the home terminal 2 (or a conventional microcomputer 10, if used) and the network host computer 8 are formatted into information packets called messages. FIG. 2 shows the basic format of the message 30. This message format is used for the majority of the messages sent between the network host and terminal 2 or computer 10. Other related formats are used in special cases discussed below.

Each message 30 begins with a one-byte start of text (STX) delimiter 32 which consists of the fixed ASCII code "2". The next field of the message, the message text field 34, can contain up to 256 bytes of transaction information. It is within this message text field 34 that the actual transaction information is transferred. The message text field 34 can also contain information concerning the status of the message.

Following the message text field 34 is a one byte start of header (SOH) delimiter 36 which has a fixed ASCII value of "1". This SOH delimiter 36 signifies the end of the message text field 34 and the start of the Sliding Window Protocol Header 38.

The Sliding Window Protocol Header 38 is provided according to an important aspect of the present invention, and contains control and error management information. This header 38 comprises a sequence number field 40, an acknowledge number field 42, a status field 44, and a checksum field 46, totalling six bytes in length.

The sequence number field 40 is important to the error detection and control system employed according to the invention. This field contains a sequence number assigned by the transmitting device (i.e. either the home terminal 2 or the network host) to each message segment. More specifically, the sequence number field 40 contains a one-byte ASCII encoded number from 0 to 9 specifying the order of the message 30 in a series of transmitted messages. The sequence numbers are assigned independently to the messages sent in both directions. Each successive message 30 is assigned a reference number one greater than that of the preceding message 30. The sequence numbers are applied in a cyclical fashion. That is, when sequence number 9 has been assigned to a message, the next message is assigned sequence number 0. This process is referred to as the "sliding window protocol" used for error detection and correction according to the invention.

The receiving device stores the sequence number of the message most recently received. When a new message is received, the receiving device determines if the content of the sequence number field 40 is one greater than the sequence number of the preceding message received. If not, an error has been detected, and the receiving device directs the transmitting device to resend the preceding message.

Additional security is provided by use of the checksum field 46, which contains a byte count for the entire message, which is written to the message by the network computer. This checksum value is compared with the byte count as determined by the receiving terminal. If the checksum value is correct and the sequence number is in the proper order, the message is considered to have been received in good condition.

The acknowledgement number field 42 of each message contains the sequence number of the last message received in good condition. Until this acknowledgement number is received, the transmitting device stores the messages in a buffer for possible retransmission. If the transmitting device has stored one or more messages with higher sequence numbers than the last received acknowledgement number, those messages with a greater sequence number are retransmitted. Correspondingly, when an acknowledgement number is received, all stored messages having sequence numbers less than or equal to the last received acknowledgement number are discarded. This sequencing and acknowledgment method allows for the continuous flow of information without the delay associated with acknowledging each message before transmitting the next, and limits the amount of data which must be stored to implement this error correction arrangement.

It will be appreciated by those of skill in the art that sliding window protocols of this general type, including use of sequence numbers and acknowledgement of messages, are generally known to the art. See generally, Tanenbaum, *Computer Networks* (Prentice Hall, 1981), esp. §4.2 "Sliding Window Protocols", pp. 148–164, which book is incorporated herein by reference.

There is, however, one limitation on this continuous flow of messages. Because the range of reference numbers is finite, the maximum number of messages which can be sent without repeating a reference number is 10. Accordingly, if all the sequence numbers available in the finite range 0–9 have been assigned to unacknowledged messages, the transmitting device ceases message transmissions and sends an immediate acknowledgement request in a null message, that is, a message which contains no information in its message text field, but which has a sequence greater or equal to that of the preceding message. The receiving device recognizes a null message by its repetition of the preceding sequence number. A null message is thus used to convey control information such as an immediate acknowledgement request.

Figure 3:
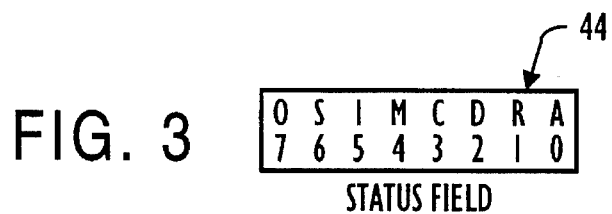

The status field 44 is a one byte (eight bit) field which informs the receiving device of the status of the message and provides a medium for various control requests. FIG. 3 details the bits of the status field 44. Bits 7 and 5 are always set to zero and one, respectively, so that the value of the complete status byte 44 is in the range of 32 to 127. Hence, the value of the status field can be represented by the ASCII codes for print characters, which is convenient for diagnostic purposes. Bit 6 indicates the transmission channel over which the message is travelling. A value of 0 in bit 6 represents a foreground, or high priority, transmission channel, and a value of 1 in bit 6 indicates use of a background, or low priority, transmission channel.

Bit 4 is used to inform the receiving computer whether the response is contained in more than one message and whether there is at least one more message to come which is related to the response contained in the present message. A value of 0 in bit 4 indicates that the present message is the last or only segment in a response while a value of 1 in bit 4 informs the receiving computer that the present message is the first or an intermediate segment of a multi-segment response.

Bit 3 distinguishes normal session messages from connect messages used when communications are first established between the home computer and the network computer. A bit 3 value of y represents a normal data message, while a bit value of 1 signifies a connect request or response. Similarly, bit 2 indicates whether a message is a normal session message or a disconnect request, in which 0 indicates a normal session message and 1 requests a disconnect.

Bit 1 is set to a value of 1 to request retransmission of all unacknowledged messages, i.e., messages with a higher reference number than the acknowledgement number of the message containing the retransmission request. A 0 value in bit 1 indicates a normal message.

Bit 0 is set to a value of 1 to request acknowledgement from the receiving computer. This signal would be sent, for example, in the situation explained above, in which the sending computer has used all of the reference numbers and requires an acknowledgement before sending any more messages. A 0 value in bit 0 indicates a normal message.

The checksum field 46 as indicated above contains a bit count or similar value calculated by the sending device; the same calculation is performed by the receiving device and compared to the scored value to confirm that the message has been correctly received.

Finally, the message 80 concludes with a carriage return (CR) 48.

According to the invention, when one of the devices involved in a communication session sends a message 30 containing either an acknowledgement request, an acknowledgement response, a retransmit request, a connect request or a disconnect request, there may be no transaction dam to be transmitted in the message text field. Hence, this information is sent through a null message, including a repeated reference number as above. This informs the receiving computer that any transaction data that may be contained in the text field is to be ignored and that the header information only is to be read. Of course, it is not necessary to send a null message for the above mentioned requests and responses. Instead, a normal message may be used which sends the request or response information, while transaction information is sent in the text field. Null messages are sent when a normal message is not available and an acknowledgement has been requested, or when the maximum number of messages is outstanding, and no more normal messages may be sent.

Figure 4:
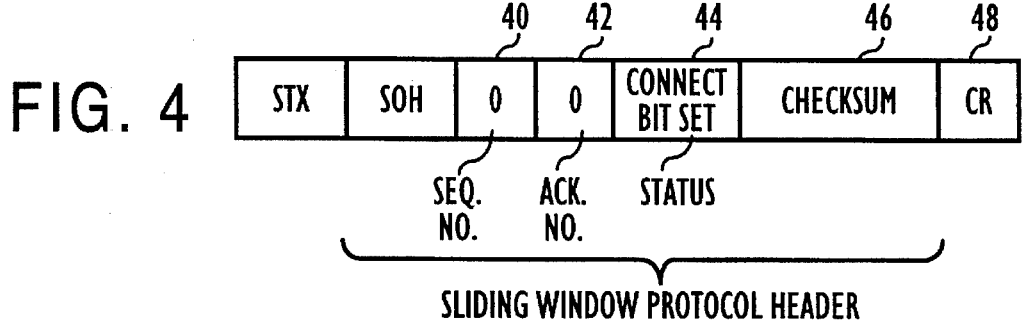

In establishing a communication session, the home terminal sends a connect request message, shown in FIG. 4. When the session controller returns a connect response, shown in FIG. 5, the session is established and all subsequent communications proceed using the message format discussed above. At the beginning of each session, a series of messages (shown in FIGS. 8 and 9) are exchanged to determine if the application pages resident in the home terminal are current versions. Where necessary, outdated application pages in the home terminal are replaced by current versions which are downloaded to the home terminal, page by page, as need be, using the predefined message format. Updates are made only with respect to the application page(s) specific to the service of current interest to the user. This reduces the delay experienced by the user, while eliminating any requirement that all users have the same version of each application page.

Because some transactions available through the network involve individual financial accounts, an exchange of user verification messages is employed in these cases to ensure against unauthorized manipulation of consumer accounts. Accordingly this aspect of the invention, when the user has indicated his intention to perform a financial transaction or other transaction requiring access to a secure database, the terminal program interface (TPI) 10 instructs the terminal computer via a downloaded page to send a request for an encryption key. The TPI returns a randomly generated key. The terminal 2 uses this to encrypt the consumer's personal identification code (PIC), that is, a code indicating his right to access the secure database. The encrypted PIC is then transmitted to the network host 8 in a user verification message. Similarly, any other secure information may be encrypted at any time during a session if the terminal program includes instructions for sending additional encryption messages. Each time a key is requested, a new encryption key is generated.

After the user verification stage is complete, (which as noted above may also include a step of identifying the user to the terminal by input of his serial number, or identification of the terminal to the network host, either or both of which must be validated before the transaction can proceed) the consumer may perform various transactions with the informational and financial service computer systems. Such transactions can take a variety of forms, as will be understood by those of skill in the art.

Once the page updating procedure has been completed as necessary and the home terminal is loaded with the application pages necessary to access the service the consumer desires, the consumer can effect transactions with service providers. Operations the.a proceed in a simple and straightforward manner. The consumer is prompted by software downloaded to the home terminal as need be to provide any additional input required, and the appropriate message is sent, by the home terminal to the service computer which actively accesses the database bank records, etc., involved. Again, according to the invention, the home terminal 2 provides a user-friendly interface, and the network host computer 58 translates the user's responses to prompts, sent by the user terminal 2 to the host in a first format, into the format conventionally employed to access the particular service computer 20(*a*–*d*) providing the service desired.

In general, it is desirable that the prompts be sufficiently definite that the user can input all required instructions using only the 12 keys of a telephone keypad responsive to prompts which are updated in response to the sequence of prior responses. This greatly simplifies use of the system, and contributes substantially to the user friendliness which is a goal of the invention. However, in some cases it may be necessary to provide all 26 alphabetic keys as well, e.g. to spell out airline destinations. In such cases, a small keyboard sliding out of the housing of the user terminal may be provided. See U.S. Pat. No. Des. 312,457 (from design patent application Ser. No. 380,557). Of course, this problem does not arise if the system and method of the invention are employed to facilitate access to service computers using a conventional microcomputer 10.

As mentioned above, according to the invention, if the consumer wishes to use a service for which the home terminal has not stored the application pages, an explicit request message can be sent for the necessary pages. For instance, if the consumer is conducting transactions with his bank's computer system and desire to check stock market listings from the stock market informational services, the consumer exits the bank service and responds to menu guides then provided by the home terminal software to access a conventional stock market service. The application page which instructs the microcomputer to display the menu containing the stock market service option also contains the instructions to call up the stock market service application pages from the resident memory. Accordingly, if the home terminal 2 finds that the application page for the stock market service is not stored in the resident memory, the terminal 2 will send an explicit page request containing the page number for the stock exchange service application page to the network computer 8. This capability clearly provides unprecedented flexibility in provision of network access to users operating simple, low-cost, user-friendly terminal devices according to the invention.

The following provides additional exemplary details of typical message formats and communication sequences according to the invention. Other communication sequences, as needed, are within the skill of the art, given the disclosure provided by this application.

When a communication session between the home terminal 2 and the network host computer 8 has been established and both devices are prepared to communicate in the link level protocol message format of FIG. 2, the home terminal 2 sends a connect request message shown in FIG. 4. The connect request message contains no information in the message text field, but the connect bit, bit 3 of the status field 44 of the sliding window protocol header (see FIG. 1), is set to 1. The sequence and acknowledgment fields 40 and 42 are shown in FIG. 4 is set to zero, but the sequence number may begin as a number from 0 to 9.

Figure 5:
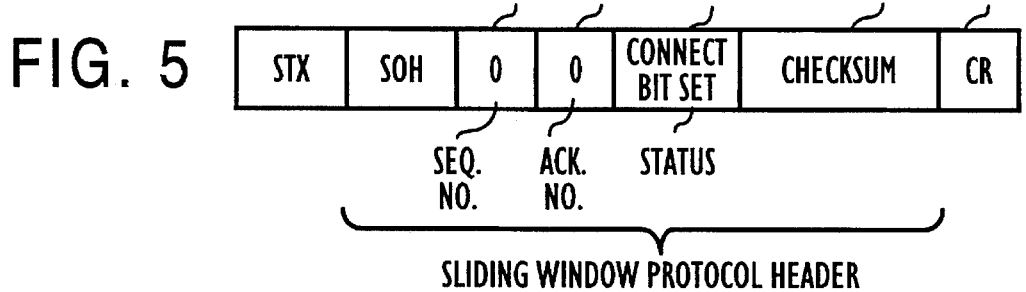

When the network host computer 8 receives the connect request message of FIG. 4 from the home terminal 2, it sends a connect message response shown in FIG. 5. As with the connect request message, the connect bit in the status field 44 is set to 1. Although the sequence and acknowledgement fields 40 and 42 are again shown here as "0", the network computer echoes back, in the acknowledgment field 42 of the connect response message, the sequence number sent by the home terminal in the connect request message. As noted, the network terminal 8 may start the sequence with any number from 0 to 9. In its next message, the home terminal 2 will similarly include an acknowledgement number equal to the sequence number of the connect response message. The other fields of the connect and connect response messages are as described above.

As discussed above, to ensure the availability of the most current software on the home terminal, individual HAL pages resident in the home terminal are updated as necessary. Superseded and outdated pages are purged, and revised versions replace earlier versions. As storage is limited in the home terminal 2, only the pages that are frequently used by the individual consumer are resident in the home terminal. Infrequently used pages can be provided by the network host computer 8 when needed by the home terminal 2 to access infrequently used network service providers. The updating process occurs at the beginning of each session, but page downloads can be requested at any time throughout the session, after the log-on process has been completed. The same communication process can be used to update pages normally stored in the home terminal when necessary.

Current versions of all HAL pages are stored by the network host computer. When new versions are developed, the new pages are transferred to the data bank of the network host computer 8. The updated pages are transferred to the home terminal 2 page-by-page during normal communication sessions.

Figure 6:
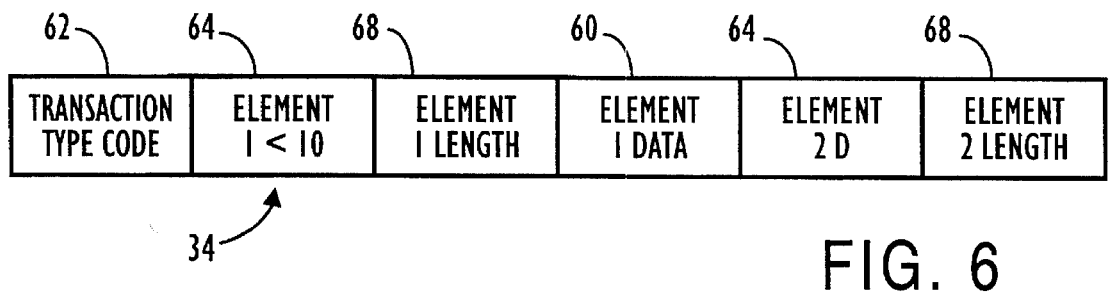
Figure 7:
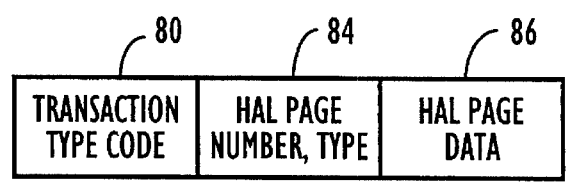

The format of the message text field of messages exchanged during the page downloading process is different than when used for transaction messages. FIGS. 6 and 7 illustrate, the different formats used within the message text field 34 with respect to conventional transaction messages and page downloading messages, respectively. As shown in FIG. 6, the transaction message includes a transaction type code field 62. All transaction type codes are three characters in length. The subsequent message elements 62, 64, 68, 60 are identified by their positions in the text field rather than by element ID fields.

More particularly, as shown in FIG. 6, the message text field 34 includes at least four sub-fields when used for sending transaction message text. The first field of the message text field 34 is a transaction type code 62, which is normally numeric. This is followed by one or more groups of three fields. Each group of three fields includes an element identification field 64, an element length field 68 and the actual element data field 60. For example, when the service computer 20(a–d) selected requires a user identification number, and a request to this effect has been sent to the home terminal 2 by the network host computer 8, the remote terminal generates a message including a code in the element ID field 64 indicating that the subsequent element data field 60 includes the user identification number. The element length field 68 then simply includes the actual length in bits of the data element 60. Additional data, such as the user account number, can be included in the same message; again, the account number would be located in an element data field 60, and would be preceded by an element ID indicating that the subsequent data field includes the account number, and an element length field 68.

This method of communicating data elements, by providing them in groups of three fields, specifying the element identification and the element length, is important to the efficient realization of the communications scheme according to the invention.

FIG. 7 shows the format of a page downloaded message. This format is used for downloading pages of HAL software from a network host computer 8 to the individual terminals 2. For example, suppose the home terminal 2 is used to initiate a communication session in response to a user's pressing a key identifying the initial request for access to a service computer 20(a–d). The initial request for access to a service will be interpreted by the network host 8 to specify the HAL application page to be used to access the service computer. If necessary, the network host will download the latest version of that page using the downloading message text format shown in FIG. 7. This text is stored in the message text frame 34 of the overall message shown in FIG. 2.

The downloading message text format commences with a transaction type code field 80 in which is provided an alphabetic transaction code indicating, for example, that the subsequent data is a page of a HAL application program. This is followed by a page number field 84 which includes the page number of the following page of software, or other identification data needed.

Finally, the actual application software page needed by the home terminal is provided in a page data field 86.

Figure 8:
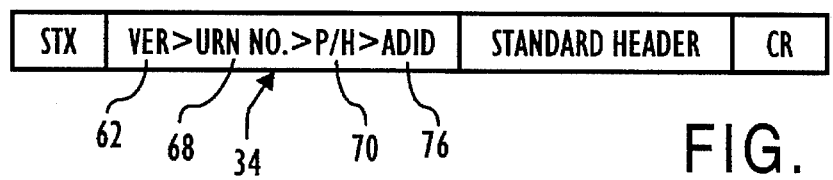
Figure 9:
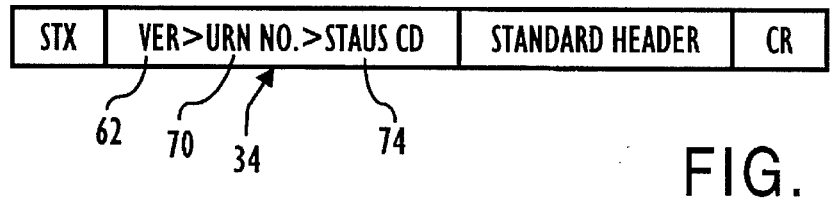

The following description of FIGS. 8 and 9 provides a more detailed view of the way in which the home terminal and network host determine that an update of a particular software page or pages is necessary. As noted, to ensure that the home terminal does not utilize outdated application pages, each session begins with a page update exchange. These are exemplary of transaction text messages, and will provide to those of skill in the art sufficient information to implement the other communications necessary to effect the functions of the invention. Other necessary messages generally follow the same format; their detailed functions and implementation are considered to be within the skill of the art.

The home terminal sends an update reference number (URN) request message following the receipt of the connect response message. Referring to FIG. 8, the URN request message is a normal message containing the URN coded request in the message text field. The URN request begins with a transaction code 62, shown here as VER. Thus, the data field 34 in this request message comprises the page numbers 68 of the application pages stored in the home terminal 2 at the beginning of the present session.

The URN messages also specifies in a field 70 marked P/H which type of home terminal is being used. This information is important in determining the priority used in sending update information. The final data field 76 includes the terminal ID (AVID). If the ADIU 76 is not validated, or has been de-validated, e.g., upon failure of the user to keep his account current, the transaction is ended.

The network computer responds to the URN request message of FIG. 8 with a URN response message shown in FIG. 9. The transaction code 62 (VER) is repeated. This repetition of transaction codes is used in all transaction messages in order for the, receiving device to determine the request message to which a given response applies. This feature is of great importance when several requests are outstanding and responses are returned out of the order in which the requests were made, that is, in connection with message exchanges not employing the sequence and acknowledgement fields of FIG. 2.

The next data field 72 in the URN response is the URN for the current application page stored in the network computer. The final data field is a 2 digit status code 74 which informs the host terminal whether page updating is necessary.

If the home terminal URN is lower than the network computer URN, page updating is necessary. The network host computer 8 accumulates the list of pages that have new versions from a cross reference file, employing the home terminal URN and the network terminal URN.

An immediate send flag is provided which is set to "1" for pages related to particularly significant functions such as log-on or the main menu displayed to the user. These pages are downloaded prior to sending the URN response message, that is, immediately upon establishment of the session. If any of the pages have an Immediate Send flag set to "1", they are put at the top of the download file. The pages with the flag set to "0" are put in a zero length transactional file:

If during the session, following the page update process, the consumer wishes to use a service for which the home terminal does not have the necessary pages, an explicit page request can be sent.

According to the invention described in Ser. No. 07/439, 739 and FWC 08/104,931 (Ahlin et al.), certain elements of the hardware of the user terminal 2 are provided by a logic cell array chip, which is reconfigurable using software downloaded from the network host computer as needed. Such reconfiguration software is stored in a remotely erasable read only memory. Other system functions, such as those necessary to accept and store the reconfiguration software, are provided by permanently written read only memory and by nonreconfigurable hardware.

As indicated above, application programs are downloaded as needed responsive to the user's selection of a particular service. According to another aspect of the invention the underlying software of the terminal, which is necessary to support downloading the application programs, provide display control, carry out communication with the network host 8, provide an initial "main menu" display, and so on, may also be updated from time to time by downloading revised versions from the network host. Preferably this is done separately from any user communication, e.g. outside normal working hours, and is done in such a way that the telephone does not ring. Details of the software structure and its functional partitioning, as well as the way in which the various software components are handled by the terminal, can also be found in Ser. No. 07/439,739 and FWC 08/104,931 (Ahlin et al.).

It will be appreciated by those of skill in the art that there have been described several important and unique aspects of the system of the invention. Of particular importance in allowing a user friendly home terminal system such as the "enhanced telephone" described in the Weiss applications to be employed with a variety of service computers is the concept of providing a network host computer which receives relatively simple requests from the terminal, and responds to these with requests for any additional data required, together with screen commands and the like, such that the home terminal can readily prompt the user to provide whatever additional data is needed. In this way the "intelligence" of the network host is effectively combined with that of the user terminal to generate all information required to access the various service computers. This limits the amount of communication between the user and the service computer to a minimum, which is important in reducing the cost of the service to the consumer.

The use of the network host 8 to update the software comprised by the home terminal page by page also has great significance, in that in this way the home terminal can be provided with many additional capabilities, while remaining a relatively inexpensive and compact unit and retaining the "user-friendly" appearance of the Weiss enhanced telephone, which is highly desirable. Furthermore, this capability allows access to further services to be provided in the future without requiring any physical modification of the terminal. The "sliding window" error detection and correction scheme is also highly useful in realizing the objects of the invention.

The use of the standardized message format discussed above, in which varying numbers of individual data elements can be communicated back and forth between the home terminal and the network host, simply by specifying the identification of the element, is also of great utility, inasmuch as this greatly simplifies communication between the terminal and the network host and renders this communication relatively flexible. At the same time, use of the same overall message format for all messages, including both data items such as user identification numbers and software such as downloaded pages, further simplifies the communication scheme provided according to the invention.

The following description relates to FIGS. 11–19, which are added in the patent application filed Aug. 25, 1993.

The home services delivery system that has been described in U.S. Pat. No. 5,195,130 (Weiss et al.; hereinafter "the '130 patent") as well as in FIG. 1 of the patent application Ser. No. 07/433,825 (hereinafter "the '825 application") may be implemented with several variations. Among the variations include different combination of placement of the packet assembly and disassembly (PAD) function and of the applications program storage.

Generally, the host computer and the home terminal share the functions of packet assembly and disassembly and storage of the applications program.

For example, when a "dumb" terminal is used, the terminal has no PAD and no applications programs. In this case, the host system performs the PAD function and retains the applications programs.

At the opposite extreme, such as one using the home access language (HAL), both the PAD and the applications programs (or downloaded "pages" thereof) are resident in the terminal. In this case, the terminal must be a comparatively "smart" terminal.

Figure 12:
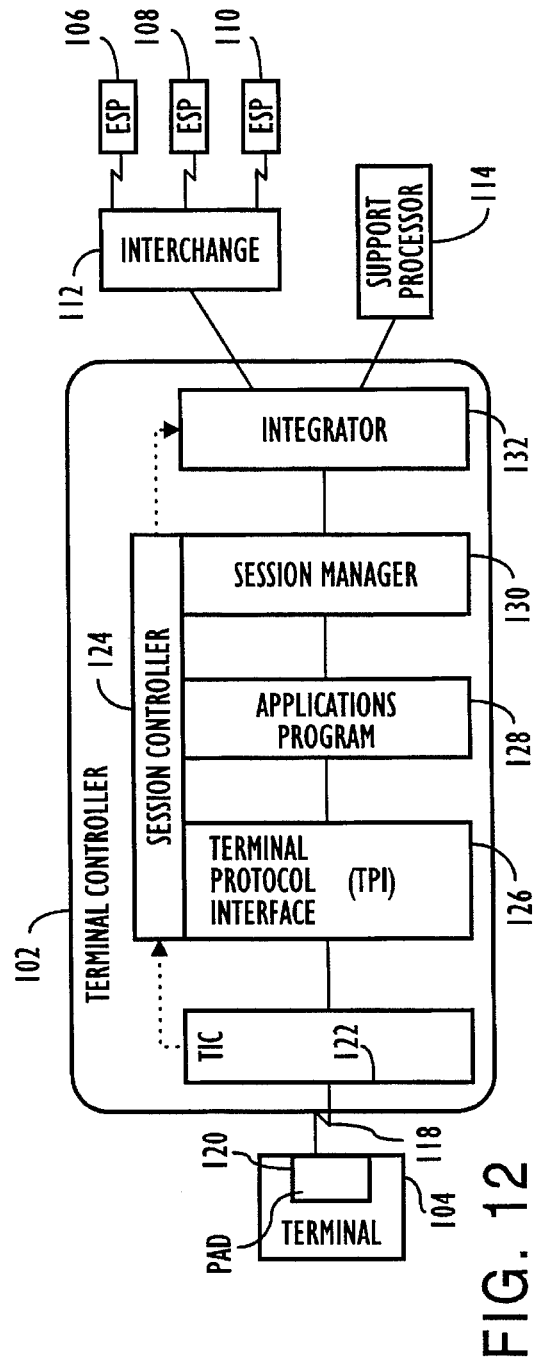

A compromise to these two extremes may be chosen, in which the PAD is placed in the home terminal (such as a telephone unit), but the applications programs are retained in the host computer. In this compromise configuration, the functions are distributed strategically between the home terminal and the host computer. By placement of the PAD in the home terminal, a highly responsive user interface is provided in a small unit. In this arrangement, applications programs do not have to be downloaded to the home terminal, and the home terminal need not include costly storage components which take up physical space. An embodiment of this architecture is illustrated in FIG. 12, and will be subsequently described in greater detail.

Figure 10:
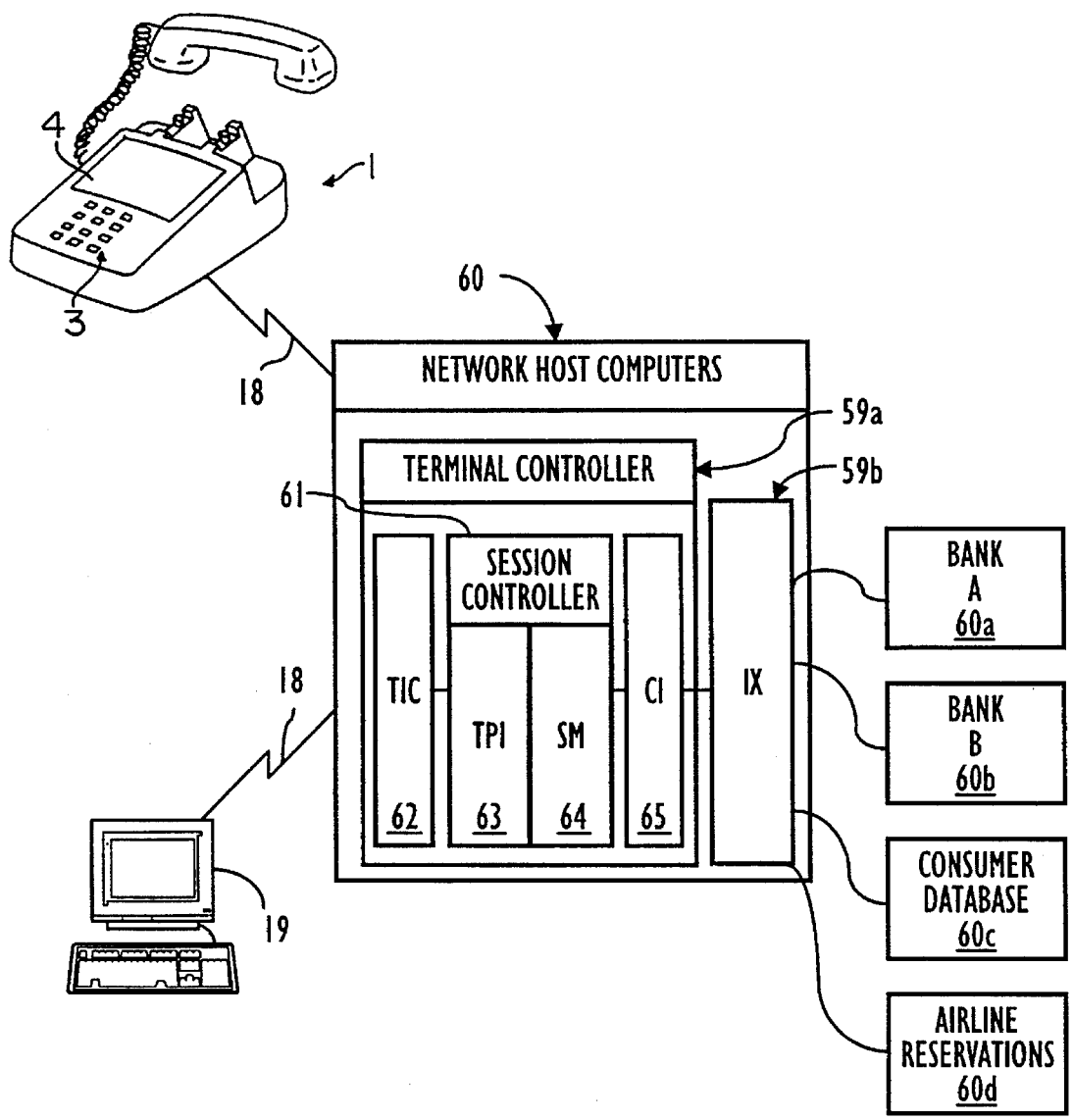
Figure 19:
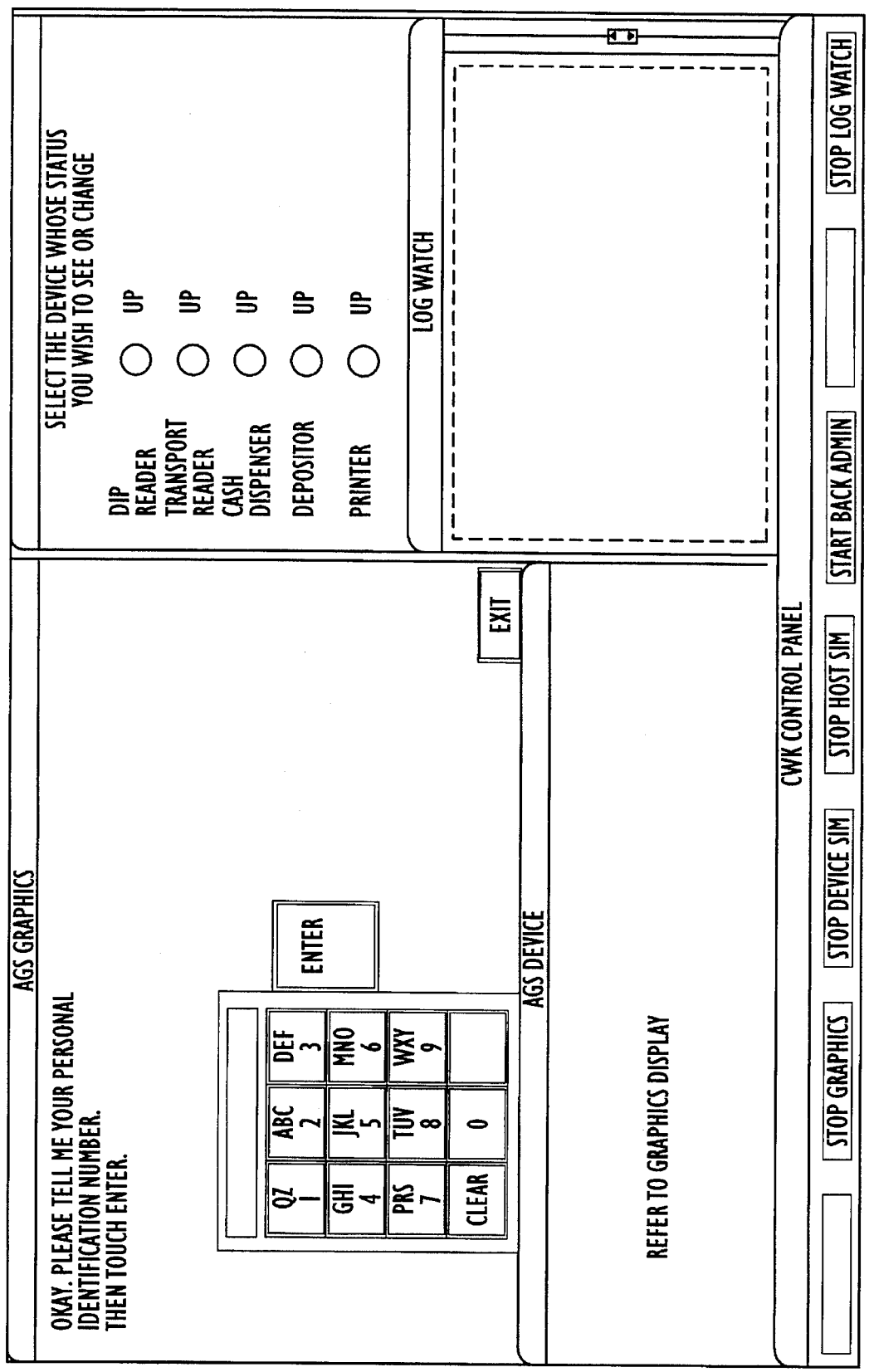

FIG. 19 of the '130 patent has been reproduced herein as FIG. 10. The following text is based closely on that of the '130 patent.

The FIG. 10 telephone-computer accesses a network host as described in application Ser. No. 433,825, filed Nov. 9, 1989. As shown in FIG. 10, each user is provided with a telephone-computer 1, including the display 4 and the keypad 3 or an equivalent terminal 19 with a keyboard, which communicates via conventional telephone lines indicated generally at 18, with network host computer 60. Hereafter, the term "terminal" shall mean the telephone-computer 1 or a PC terminal 19.

The network host computers include Terminal Controllers 59*a* and Interchanges 59*b*. The terminal controller comprises hardware and software functions.

One essential function of the network host computer 60 is to provide a series of application program "pages" which are downloaded to the terminal. The downloaded program pages supply the terminal with sufficient "prompts" to elicit from the user whatever information, i.e., user codes, desired transactions, and the like, required to access one of a plurality of service computers 60*a–d* to which the network host computer 60 is connected via conventional telephone lines.

More particularly, suppose the user desires to access the service computer 60*a* of Bank A. When the user activates a terminal, there will appear on its display screen a menu allowing him to select "Access Bank Services" by pressing, for example, the numeral "3" button on the keypad 3 of the telephone-computer or any other keys designated for such access in the terminal. If the user presses the button, the terminal will send a message to the network host computer 60 which in turn consults its internal memory to locate an application program required to access the service computer 60*a* of Bank A and will download an appropriate program to the terminal. The terminal will in turn operate using this program and will ask the user various questions required to prompt the user to input the information needed to access his account at the bank, i.e., for example, his account number, his secret access code, the type of transaction desired, the amount of deposit, withdrawal, or transfer required, and so on. This information is then transferred from the terminal to the network host computer in a message having a first protocol.

The network host computer transforms this information into whatever second protocol is conventionally required to communicate with the service computer 60*a*, for example in the precise manner in which automatic teller machines communicate.

If, on the other hand, the consumer desires to access Bank B, typically, the consumer will be asked the same questions by way of prompts, but the network host computer will transform the answers into the protocol required to access the service computer 60b of Bank B.

To access a consumer database host computer 60c, a different sequence or prompts would be provided by the terminal, using appropriate pages of application program software downloaded by the network host computer. Similarly, different communication sequences would occur between the network host computer and the airline reservation host computer 60d. The communication sequence, and in particular the detailed format of the messages back and forth between the telephone-computer or equivalent terminal and the network host computer, are described in detail in the '130 patent.

Communications between the network host computer 60 and the various service computers 60a–d takes place according to various second protocols defined by the proprietors of the services supported by the service computers. Implementation of these communications follows the techniques now in use with such preexisting service computers, and is considered to be known by one skilled in the art.

It will be appreciated that the accessing of the various service computers 60a–d and countless others, requires that the network host computer be enabled to communicate according to a like variety of protocols.

The terminal controller 59a serves as a link to the terminal, and the interchange (IX) 59b serves as the link with the plurality of informational and financial service computer systems 60a–d. Notably, this linking is accomplished without modifying the software of the service computers 60a–d. Thus, an important function of the network host computer, the telephone computer, and the software which it runs, is transforming between the highly simplified "user-friendly" request/response sequence (menu) seen and responded to by the user, and the complex communication sequence normally used to access the service computers 60a–d.

According to an important aspect of the invention, these menu choices are varied in accordance with the service selected by the user. That is, the user-friendly interface comprising a "tree" of new menus, is displayed sequentially and in response to each input provided by the user, until all information required to access the service has been specified. The interface varies with the service. Provision of application programs page by page in response to the specification of a service according to the invention permits this flexibility, as it would be impractical to store all possible application programs in the telephone-computer.

The terminal controller 59a functionally comprises a terminal interface controller (TIC) 62, a session controller 61, and a common integrator (CI) 65. The session controller 61, in turn, controls a terminal protocol interface (TPI) 63 and a session manager (SM) 64.

The TIC monitors the message flow between the telephone-computer and the TPI, and controls timers to cause timeouts when message traffic ceases. The TPI communicates with the telephone-computer and translates the protocol used by the telephone-computer when first establishing a connection with the network host computer. Additionally, the TPI generates random encryption key numbers when requested by the terminal. These encryption key numbers are used by the terminal program to transmit confidential information. The TPI also handles application page downloading requests.

The SM maintains the essential data needed for each communication session by storing information relating to the user of the terminal and the service computer system 60a–d which the user is accessing. All transactions performed between the terminal and the session controller during a particular session occur within the context of the specific consumer and the service selected, e.g., his bank or other financial institution. For example, after the consumer has been successfully established as a valid and authorized user, all message traffic to the particular terminal is thereafter considered related only to that consumer. This context determination, based on the consumer identification information, then allows the network host computer to access the correct service computer 60a–d for such items as account balances, and so on. The SM stores the contextual information required to validate the transaction and inserts it in messages passed to the CI when necessary. The SM also serves as the interface between the TPI, and the CI, which in turn serves as the communication link between the other elements of the session controller and the service computer systems 60a–d.

The user accesses one particular service network 60a–d by selecting the corresponding option, i.e., the desired service, from a menu displaying the possible choices on the terminal display. Communication between the terminal, the session controller, and the selected service computer 60a–d then begins with a session establishment and protocol selection phase.

During the session establishment and protocol selection phase, the terminal connects to the network host computer through the standard telephone line 18. After the connection has been established, the telephone computer sends a series of signals by which the session controller sets such parameters as the communication baud rate. For example, after the network host computer sets the communication baud rate, it responds with a terminal type inquiry. The terminal interprets this signal as a request to identify the type of terminal in use and responds with an ASCII code identifying the type of home terminal being used, i.e, the telephone-computer or a PC terminal.

The network host computer provides the important function of allowing the telephone-computer to mimic a conventional microcomputer running essentially conventional communication software. Therefore, the service computer 60a–d receives communication in precisely the same "service computer communication protocol" which it conventionally receives. Accordingly, the service computers need not be modified in any way for communication. As indicated, such conventional microcomputer systems 19 may also be interfaced to the service computers 60a–d by way of the network host computer. In such a case, the network host computer will again respond to a request for access to a service computer 60a–d by downloading one or more "pages" of application software, user prompts, etc., allowing the conventional microcomputer 19 to conveniently access the service computer 60a–d.

After a communication session has thus been established, a "link level" protocol is employed between the terminal and the session controller. In the link level protocol, all communications between the terminal and the network host computer are formatted into information packets called messages, as further described in the '130 patent.

Figure 11:
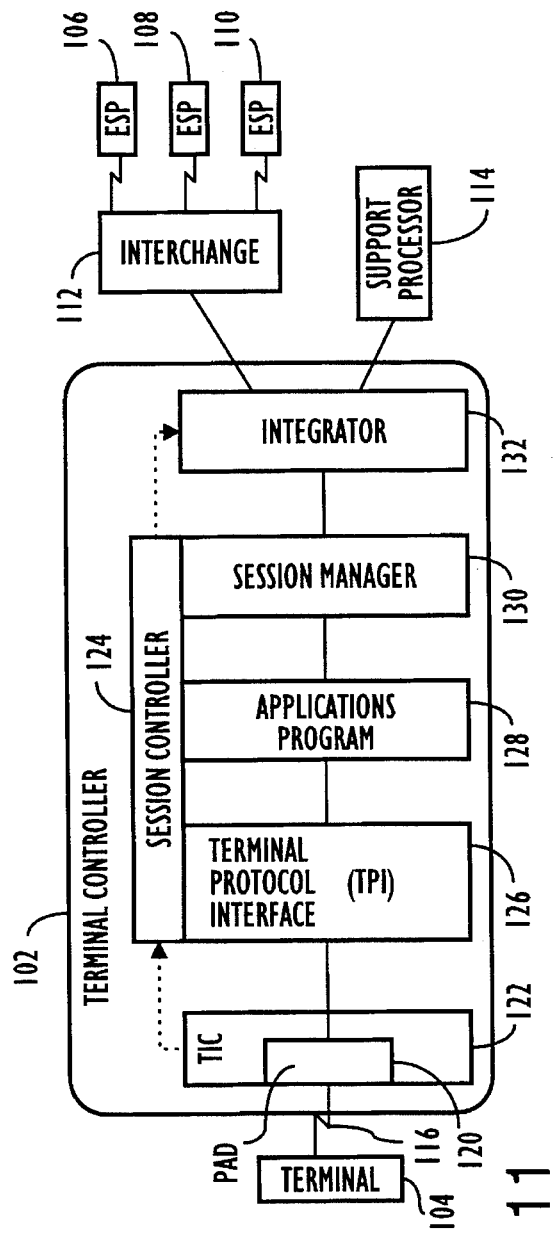
FIGS. 11–19 are added in the application being filed Aug. 25, 1993.

This ends description directed to FIG. 10 derived directly from the '130 patent. The description of the system in FIG. 1 has been provided above. Still another home services delivery system according to the invention is shown in FIG. 11. Many of the elements in FIG. 11 have functions identical to those of corresponding elements shown in FIGS. 1 and 10, and to that extent, need not be further described here. Further, FIG. 12 illustrates a variation of the embodiment shown in FIG. 11, the main difference being the placement of the packet assembly and disassembly (PAD) function.

The following discussion focuses on the elements which are common to FIGS. 11 and 12, with the understanding that the difference in placement of the PAD results in a system with improved performance, as described above. Description of functions in FIGS. 11 and 12 which are the same as in earlier-described embodiments need not be duplicated here.

A terminal controller 102 facilitates communication between a terminal 104 and anyone of a plurality of external surface providers, 106, 108, 110 via an interchange 112. Also provided is a support processor 114 whose function is described below.

A packet assembler and disassembler (PAD) schematically indicated as element 120, is also provided in both embodiments of FIGS. 11 and 12. In the FIG. 11 embodiment, the PAD function is provided within a terminal interface controller (TIC) 122. However, in contrast, in the FIG. 12 embodiment, the PAD function is provided within terminal 104.

As readily appreciated by those skilled in the art, PAD elements are known in the art. For example, an X3 standard, or a PAD of other standard or customized design, may be employed as element 120. However, the PAD which is employed should have the functionality described below, to be optimally useful in the home services delivery system.

In embodiments of both FIGS. 11 and 12, the terminal controller 102 includes a session controller 124, a terminal protocol interface (TPI) 126, an applications program 128 a session manager 130, and an integrator 132. These various elements are implemented and function as follows.

The terminal 104 may be any device which is authorized and able to communicate with the home services delivery system. In particular, the terminal 104 may be implemented as a personal computer 19 (FIG. 10), an enhanced telephone 1 (FIG. 10), or any device capable of emulating a terminal. A particular intelligent terminal emulator is discussed in greater detail below.

The purpose of the packet assembly and disassembly function is to collect input from the user, and present it in a format acceptable to the terminal interface controller 122. The PAD also allows the TIC to send information to the terminal.

In a particular exemplary embodiment, a screen processing request is transmitted from the TIC to the terminal. The screen processing request has a text element which includes screen request text.

The message transmitted to the terminal is divided into various segments in any suitable practical way. Each message segment includes a message type code, a message type length, followed by the message itself.

The message type code specifies whether the message is, for example, a screen display message, or an input field description. Of course, the message type code may define messages having any other meaning with respect to the terminal in question.

The message type length expresses the length of the message data which follows.

As recognized by those skilled in the art, certain binary sequences of message data may coincidentally be identical with ASCII data bytes which are significant to the PAD-TIC communications protocol, Such sufficient characters are STX, ETX, ACK, and so forth. Those skilled in the art will readily recognize that the PAD should ensure that the message itself does not contain any unintended protocol-significant characters. In an exemplary embodiment, the protocol-significant characters are avoided by setting certain bit uniformly high, thereby avoiding the protocol-significant characters within the message itself.

It is preferable that a sliding window protocol, such as that described in the related applications listed above, be employed. A sliding window protocol helps to ensure that any data passing between the PAD and the TIC is substantially error free, as guaranteed by such procedures as parity checking and/or checksum comparison.

Many implementations of the PAD may be chosen, in accordance with principles known to those skilled in the art. However, as introduced above, the placement of the PAD in the terminal rather than in a terminal controller's TIC, provides advantages which have not heretofore been recognized, especially in the context of a home services delivery system.

The TIC controls communications in all the various sessions that are active at a given time, informing the session controller 124 of the beginning or ending of each session. Essentially, the TIC 122 provides timing control and message traffic flow control.

The session controller 124 is called by the TIC 122 when the TIC recognizes and acknowledges a new session begun by a customer. When called by the TIC, the session controller 124 calls up a terminal protocol interface (TPI) 126, applications program 128, and a session manager 130 (collectively called a "triplet"), and causes the triplet to be connected to an integrator 132.

The terminal protocol interface 126 includes software which is specific to the particular type of terminal 104 which is in the system. Each terminal protocol interface 126 translates information into and out of the particular protocol of the specific terminal, thus managing message flow into and out of the terminal. In contrast to the terminal protocol interface 126, the applications program 128, session manager 130, and integrator 132 include software which is the same regardless of the terminal involved in the session.

The session manager 130 establishes and maintains session context, handles security and access control, governs activity logging, enhances messages, and manages list processing.

The integrator 132 generates messages to the external service providers 106, 108, 110 through a suitable interchange 112. When the integrator 132 receives a message from terminal 104 through the terminal protocol interface 126, program 128 and session manager 130, it sends messages through the interchange 112 to the appropriate external service provider. Conversely, the integrator 132 collates any return information received from the external service providers through the interchange, and returns the messages to the terminal through the session manager, applications program and terminal protocol interface.

The interchange 112 is essentially a network which routes and manages message traffic to and from the external service providers.

A support processor 114 is provided as a storage area for a customer database, account list information, transaction parameters, activity log files, and the like. The support processor is summoned by the integrator when it needs information for such purposes as access control, to ensure that the user of the terminal has a proper level of clearance to use a given external service provider.

Finally, the external service providers may be those institutions shown in FIGS. 1 and 10, such as banks or other financial institutions, consumer databases, airline reservation services, services for equity, bond, and option quotations and brokerage, news retrieval sources, and the like. In a particular preferred embodiment, the external service providers are financial institutions, and the terminal 104 is a telephone computer such as that shown in FIG. 10, the telephone computer terminal having the PAD element contained within it.

Referring again to FIG. 12, the terminal interface controller 122 and session controller 124 are resident in the terminal controller 102 at turn-on. In a typical system, elements 122, 124 comprise about 10% of all the code within the terminal controller. The remaining 90% of the code lies within the triplets comprising terminal protocol interface 126, applications program 128, and session manager 130.

The three-element "triplets" 126, 128, 130 are not resident and active all the time, Rather, a given triplet is brought up when a customer activates a session by entering information through terminal 104, and are terminated when the session is complete. More specifically, when a customer begins a session, the terminal interface controller 122 recognizes it and informs session controller 124. Then, session controller 124 causes a triplet of elements 126, 128, 130 to be activated for that particular session. After the triplet is called up, the terminal interface controller 122 communicates with the triplet through the just-activated terminal protocol interface 126.

Should a user activate another session, the process described immediately above is repeated, using another triplet. That is, for a second session, a second triplet 126, 128, 130 is activated. Thereafter, the code contained within the two triplets is concurrently executed by a processor within the terminal controller 102.

In this manner, the different sessions instituted by the terminal(s) are effectively separated. This provides the advantage that, in the event of a session crash, only one session will be lost, and not any other sessions which may be active at the time. Accordingly, the home services delivery system, considered as a whole, is very fault-tolerant.

The integrator 132 has a loose association with the triplets 126, 128, 130 as they are activated and de-activated. There need not be a one-to-one correspondence between triplets and integrators. Rather, a sufficient number of integrators 132 are activated, based on the demands of communicating with external service providers.

When a session is ended, the session controller 124 de-activates the particular triplet 126, 128, 130 in question. However, triplets activated for serving any other pending sessions remain active. However, when a given session is terminated, a terminal controller may de-activate an integrator, if the reduction in communication demand caused by the session termination warrants it.

The various elements 122, 124, 126, 128, 130, 132 within terminal controller 102 communicate via a transport-level interface which is transparent to the structure of the underlying physical network. Here, the term "transport" refers to the fourth layer as designated in the Open Systems Interconnection (OSI) standard. The first through seventh layers, as appreciated by those skilled in the art, are the physical layer, the data link layer, the network layer, the transport layer, the session layer, the presentation layer, and the application layer. The transport-level interface according to the present invention may be called a "transparent" transport mechanism (TTM). The transport mechanism is "transparent", in the sense that functional blocks may use it to communicate without being forced to adopt a particular hardware configuration.

As described above, the elements in FIGS. 11 and 12 are understood to be functional blocks, and substantially independent of any particular hardware configuration. For example, the terminal controller 102 may be a single computer, with the various functional blocks contained 122–130 within it having software which is executed on the terminal controller's processor. However, the various functional elements within the terminal controller 102 may be distributed among other processors. In fact, an increasingly common trend has been to use several microprocessors acting in parallel, instead of using a single minicomputer or mainframe computer. The present invention can be embodied to embrace this trend by strategically allocating microprocessors to different tasks. Accordingly, various physical implementations of the same functional blocks may be provided.

The flexibility of physical implementation of the functional blocks is enhanced by the transparent transport mechanism (TTM). The TTM is transparent to the physical structure of the system. In FIG. 12, the TTM may be considered to "underlie" the elements 122–132, and is actually implemented in the kernel of UNIX as a device driver to improve speed. Thus, any applications programs (within triplets 126, 128, 130) do not need to know any physical addressing or underlying communications protocols, because the TTM is essentially a name-based transfer mechanism. Because about 90% of the code in the terminal controller is in the triplets, the physical system components and the individual triplet elements can be changed independently of each other without the necessity of re-compiling other software. For example, in the event that a system is being upgraded to have a larger number of microprocessors, only the TTM itself, as well as the terminal interface controller 122 and session controller 124 would have to be adjusted.

Figure 13:
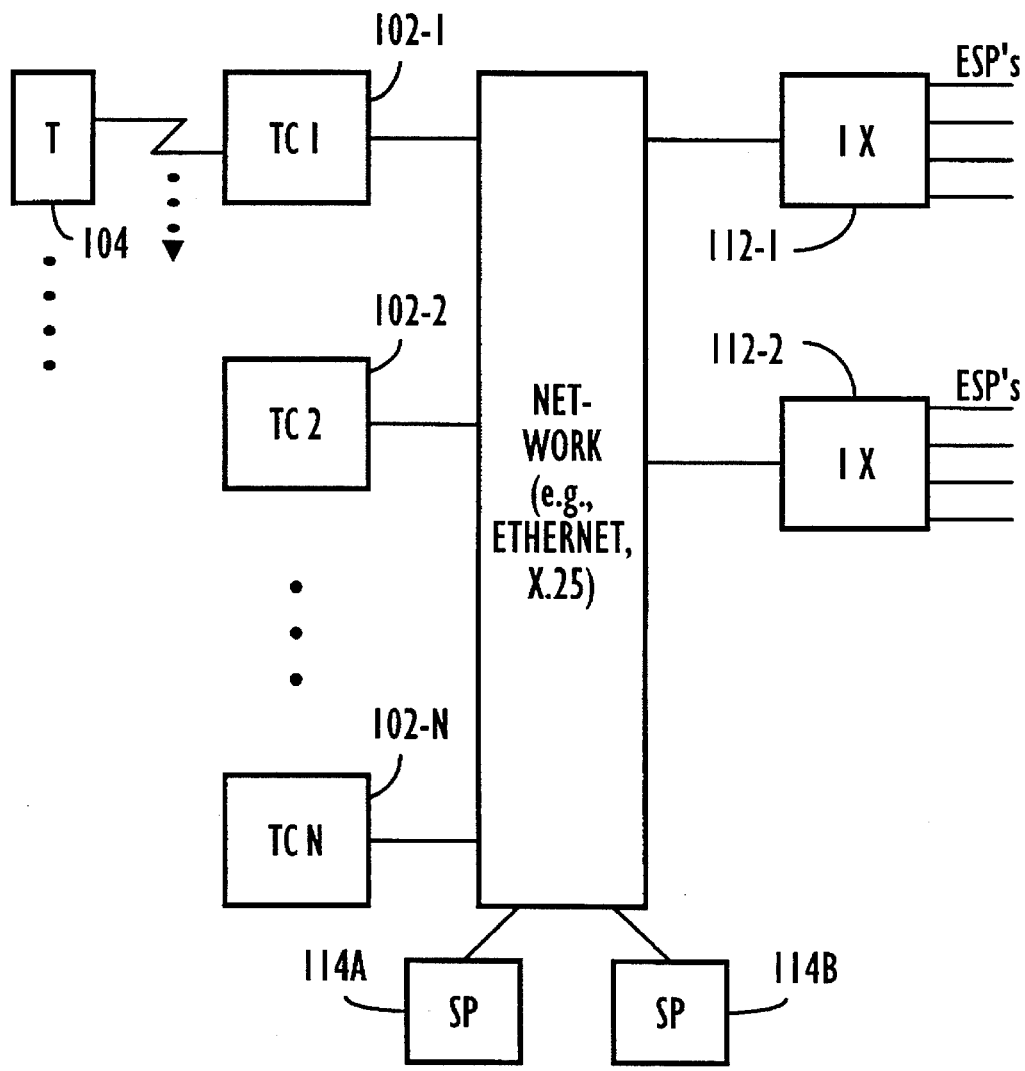

FIG. 13 illustrates a typical physical view of an embodiment of the home services delivery system. In FIG. 13, several terminal controllers 102-1 . . . 102-N (such as FIG. 12, element 102) are provided. Several terminal controllers must be provided, so that varying numbers of incoming calls from various terminals can be handled. As the various calls arrive, they are assigned to one of the terminal controllers. If a given terminal controller is down or if it has activated as many sessions as its capacity will allow, the call rolls over to a next terminal controller. If all terminal controllers are busy or down, the accessing terminal receives a "system busy" message.

Also illustrated in FIG. 13 are interchanges 112-1, 112-2 which receive messages through a network, such as an X.25 network or ETHERNET. The interchanges route message traffic to and from the external service providers. If one interchange is down, traffic may be routed through another interchange. Finally, two support processors 114A, 114B are provided, each normally handling their respective different tasks. However, when one is down, the other may take all the messages.

In contrast to the dial-up connections between the terminal 104 and the terminal controllers 102, the communications links between the terminal controllers 102 and the external service providers are preferably permanent connections. In this manner, the overall system provides rapid response between the terminal and the service provider, substantially independently of the number of terminals which may from time-to-time access the system.

Returning to discussion of FIG. 12, the PAD 120 is illustrated as resident in terminal 104. This is a feature distinguishing it from the embodiment of FIG. 11. Thus, the interface on path 116 (FIG. 11) is substantially different from the interface on path 118 (FIG. 12).

Briefly, the embodiment of FIG. 12 provides the PAD within the terminal so that the information entered by the customer is initially screened before the terminal interface controller 122 ever receives the information. This is in contrast to the information passing on path 116 (FIG. 11), which is essentially "raw" data input through a relatively "dumb" terminal. In the FIG. 12 embodiment, the applications programs remain in UNIX code in the terminal controller, whereas in the embodiment of FIG. 11, the applications programs (or at least "pages" of the program) are downloaded to the terminal.

Briefly, the PAD 120 performs two types of error correction. The first type of error correction, termed "telephone transmission error correction". Telephone transmission error correction involves correction of or compensation for noise on the telephone lines or other channel 118. A second type of error correction, termed "data entry error correction", involves input of the customer's key entries, echoing characters to the terminal screen, transaction information accumulation, and data packet assembly. Both telephone transmission error correction and data entry error correction are performed local to the customer, providing the rapid response which is desirable in consumer products.

In contrast to the embodiments which use the Home Access Language (HAL), the embodiment of FIG. 12 does not involve downloading of programs, or even of HAL "pages" as such. Rather, messages are sent from the terminal controller to the PAD via communication's path 118.

These messages include screen text and associated input fields. Essentially, the screen text is used to prompt the customer to enter information into the terminal. The input fields, which have associated data types, facilitate data entry error correction.

The PAD includes means for responding locally to data which is input to particular input fields. The PAD responds according to the data type of the input field.

For example, if a particular data field calls for a date to be entered, the PAD determines whether the input data corresponds to a proper and meaningful date. Similarly, if the data type is required to be text or numeric, the PAD determines whether the data entered is in fact text or numeric data, respectively, and responds appropriately.

An appropriate response to a correct data entry is to echo characters to the display, to visually confirm to the customer that his data entry is proper and has been received. If, however, the data entered is determined to be of the improper type, a suitable response is displayed. A suitable response might include a "?" character, an audible tone (if one is provided with the terminal), or a more descriptive error message.

As another alternative, the input field data type may indicate a confidential sequence of data, such as a password or personal identification number (PIN). The use of such confidential data is of great importance in financial transactions, to control access to data in banks and other financial institutions. Accordingly, when a data type associated with an input field reflects that the data being entered should not be literally echoed, the PAD determines that a suitable "dummy" character, such as an asterisk, should be sent to the terminal's display. In this manner, the confidentially of the password or PIN is protected, and the security of the information in the service provider data banks, is enhanced.

Each of these responses to a customer's data input is generated locally, because the PAD is resident in the terminal. Advantageously, the FIG. 12 embodiment ensures rapid feedback to the customer when he presses a button, because all intelligence for initially screening the customer's entries is resident in the terminal PAD. This arrangement is in contrast to the FIG. 11 embodiment, in which individual keystrokes must be sent from the terminal to the PAD which is remotely located from the terminal, this remoteness causing annoying delays to the customer. The FIG. 12 embodiment has the further advantage that it can be small in size and relatively simple in architecture, because it does not need to receive any downloaded applications programs.

Because the terminal responds immediately to the customer's input, and because of the level of sophistication provided by the terminal's PAD in communication with the terminal controller, the terminal essentially functions as an intelligent terminal emulator. This is particularly noteworthy in embodiments in which the terminal is contained within a housing resembling a conventional telephone, and in which the terminal indeed continues to function as an ordinary telephone when not being used as a terminal.

Application Generation System

Figure 14:
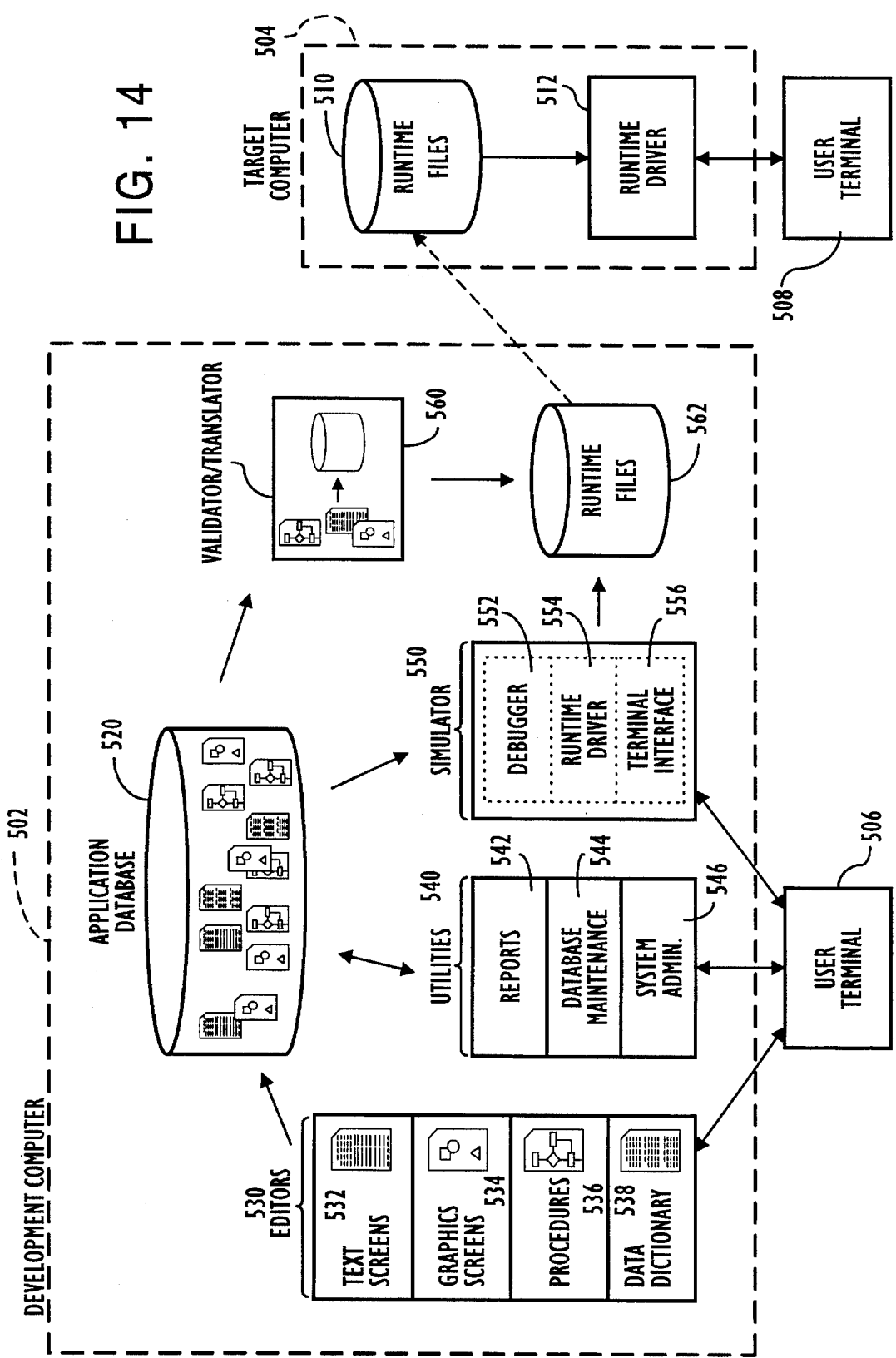

The invention also provides an application generation system (AGS) which may be used to develop, debug and test applications programs for the home services delivery system described above. FIG. 14 is a high-level block diagram which schematically illustrates the application generation system according to a preferred embodiment. The FIG. 14 embodiment is for use by a single programmer, as compared to the multi-programmer embodiment shown in FIG. 15.

Briefly, the application generation system is an apparatus for facilitating generation of applications programs especially suitable for a service delivery system. Again, the above-described service delivery system has a terminal with a PAD element and a terminal controller in communication with the terminal via the PAD element. As described in greater detail below, the application generation system has an application data base, and a plurality of editors including means for allowing a user to generate applications program elements for storage in the application data base. The system also has a validator including means for providing compatibility of the elements of the applications program, and storage means, responsive to the validator, for storing runtime files executable by the service delivery system. Also, the system has a simulator including means for executing the runtime files from the storage means to simulate, among other things, communication between the terminal and the terminal controller via the terminal's PAD element.

Referring now to FIG. 14, a development computer 502 is shown with a target computer 504. Target computer 504 may be, for example, the home services delivery system described above. The development computer and the target computer have respective user terminals 506, 508. For purposes of this discussion, it is assumed that the target computer has runtime files on a storage medium 510. The user terminal 508 may access and interface with the runtime files via a runtime driver 512. An essential purpose of the development computer 502 is to facilitate the generation, debugging, and testing of applications programs for the target computer.

Within the development computer 502 is an application database 520. The content of the application database is described below, with reference to FIG. 16.

Also illustrated within the development computer 502 are a variety of editors, generally indicated as element 530, utilities generally indicated as 540, and a simulator 550. A validator/translator 560 is also illustrated. Runtime files are stored in a suitable database within the development computer, as generally indicated at 562. Each of the elements 530, 540, 550, and 560 are in communication with the application database at one time or another throughout the application generation, debugging, and testing process.

In the illustrated embodiment, various editors are provided. First, a text screens editor 532 is provided. The text screens editor allows the programmer to edit text on the screens of display devices of the target computer for which the application is written. For example, in the example of a telephone computer, the text screens would involve the displayed prompts of the telephone computer. The development computer also has a graphics screens editor 534. This editor allows a programmer to design and edit any graphics which are to be displayed on the user terminal.

The development computer also includes a procedures editor 536. The procedures editor allows writing and editing of essential programming code which governs the operation of the applications program.

Finally, the illustrated embodiment of the development computer includes a data dictionary 538. The data dictionary is described below, with reference to FIG. 16.

Collectively, the editors 530 produce information which is stored in the applications database 520. Moreover, the editors include many validity checking procedures which screen any text screens, graphics screens, procedures, or data dictionary entries which are unacceptable for some reason, such as those being self-contradictory or of improper format. In this manner, the editors ensure that, during a development process, only text, graphics, procedures, and data dictionary entries passing certain integrity and format checks are allowed to be stored in the application database 520.

The validator/translator 560 carries this validity checking process even further, while translating the source code from the application database into runtime code for storage on storage medium 562. The validator portion of validator/translator 560 performs additional tests on the source code, such as, for example, to verify that one screen's reference to another screen is valid.

Thus, the editors 530 perform internal validation checks for each of the various components (graphics, text, procedures, data dictionary entries), whereas the validator within element 560 carries out various compatibility and consistency checks so that the runtime code stored in element 562 is substantially free of most programming errors, even before simulator 550 operates on it.

Utilities 540 in the development computer 502 allow the programmer to more easily develop the applications program. For example, the reports utility 542 allows generation of reports relating to the applications program, such as basic printouts of source code or other relevant information.

Also, database maintenance utilities 544 are provided. These utilities operate on the application database 520 so that basic operations, such as adding and deleting applications, can be easily performed by the user through terminal 506.

Moreover, system administration utilities 546 are provided. These administration utilities include adding and deleting authorized users and controlling access to the development computer through use of passwords.

The simulator 550 includes a comprehensive debugger 552. Among other debugging tools, the debugger has breakpoint capability, which allows a programmer to view the status of the applications program anytime during execution, at any pre-chosen part of the program.

The runtime driver 554 allows the programmer to run the runtime code from storage medium 562 in a manner governed by debugger 552. A terminal interface 556, which may be an intelligent terminal emulator 104 (FIG. 12), is also provided.

In operation, the development computer 502 uses the simulator 550 to execute the runtime files from storage element 562. Significantly, the runtime files in element 562 may be exactly the same files as in runtime file storage element 510 within the target system 504. In this manner, exactly the same code which will be installed in the target computer can be thoroughly tested before installation. This authentic pre-installation testing helps to ensure that subsequent software testing and installation periods in the target computer are as short and trouble-free as possible.

According to the preferred embodiment, the AGS provides that the procedure language is entered with minimum possibility of formatting error. The commands of the procedure language include predetermined portions which are presented to the programmer, with blank fields representing the "variable" portions which the programmer enters. Because the programmer does not enter the invariant portion of the command, the number of formatting errors is greatly reduced. The following list of commands is provided in an exemplary embodiment of the AGS:

Basic:
    SET <variable> TO <expression>
    DISCARD <variable>
    IF ... THEN ... ELSE
    REPEAT
    GOTO <procedure>
    CALL/RETURN
    EXIT
    RESTART
Screen I/O:
    PREPARE <frame>
    PRESENT <frame>
    RETRY INPUT
Error Handling
    WHENEVER <condition>
Message I/O:
    SEND <message>
    WAIT FOR <message>
    READY FOR <message>
    CANCEL <message>
Table Manipulation
    INSERT INTO <table> AT <row>
        FROM <table> WHERE/AT <rows>
    DELETE FROM <table> WHERE/AT <rows>
    REPLACE <table> WHERE/AT <rows>
        WITH <table> WHERE/AT <rows>
    WITH EACH ROW <table>
        WHERE/AT <rows>

In this list of commands, the words which are in capital letters represent the invariant portion of the command. The variables, expressions, procedures, frames, conditions, messages, rows, tables, and other information which is bracketed < >, represent the information which the programmer enters. After the programmer enters the information, the editor ensures that the data entry is of the proper type and is meaningful. In this manner, improper command formats, as well as some higher-level problems, may be prevented before compilation and simulation.

Figure 15:
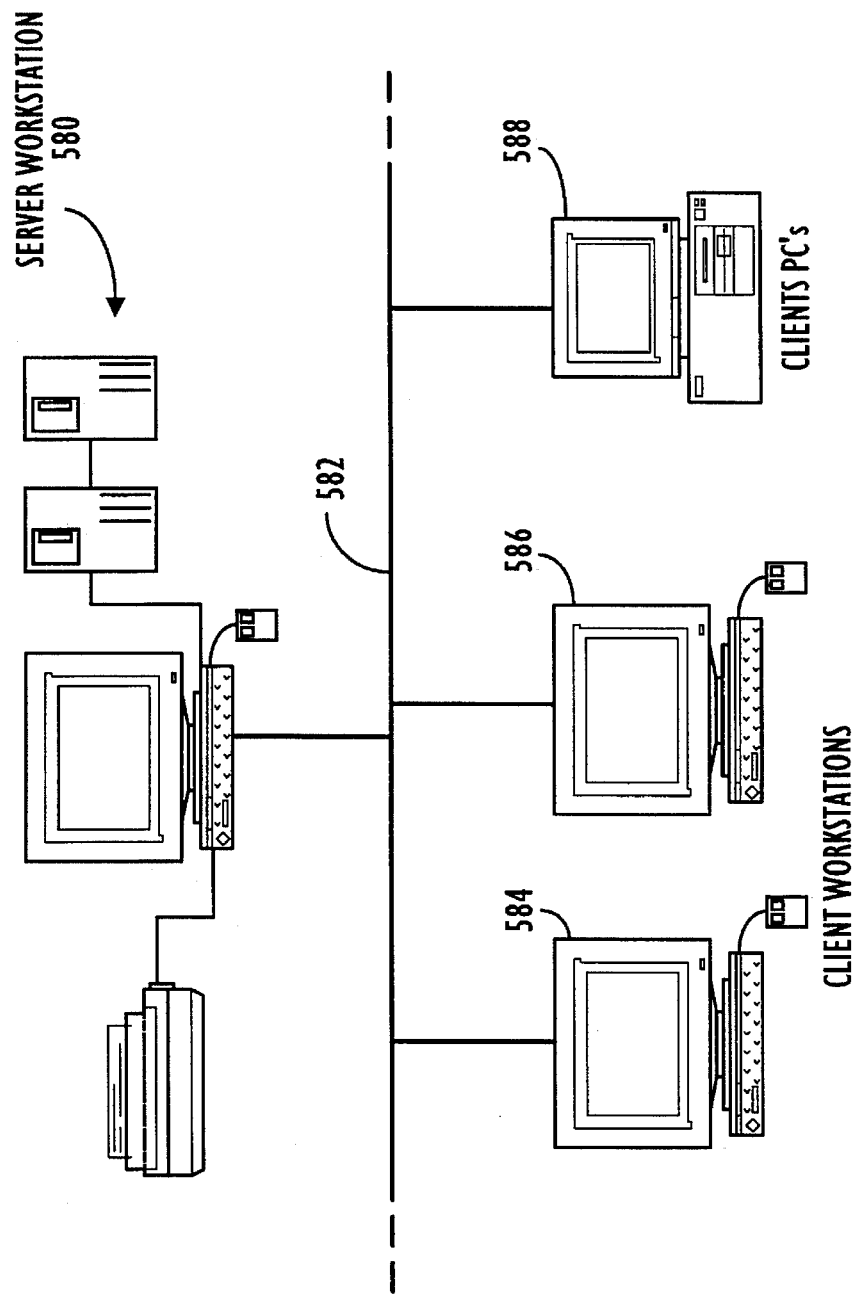

FIG. 14 illustrates a single-programmer embodiment. However, FIG. 15 illustrates a local area network which is another useful configuration for an application generation system according to the present invention. In FIG. 15, the single-user component which has been discussed above, is illustrated at 580. However, along the local area network 582 are other work stations 584 and 586, along with a client personal computer ("PC") 588.

In the client work stations 584, 586, the application generation system runs locally. However, the database which is stored on the LAN server is shared among the various users.

However, in the client PC 588, the application generation system actually runs on the server, and not on the PC. The user of the client PC uses only windows which are sent from the server.

In the arrangement of FIG. 15, it is possible for a team of programmers working at various work stations or even a PC, to contribute their effort to the development of a single applications program, or to a corresponding number of different applications programs, using the tools illustrated in detail in FIG. 14.

Figure 16:
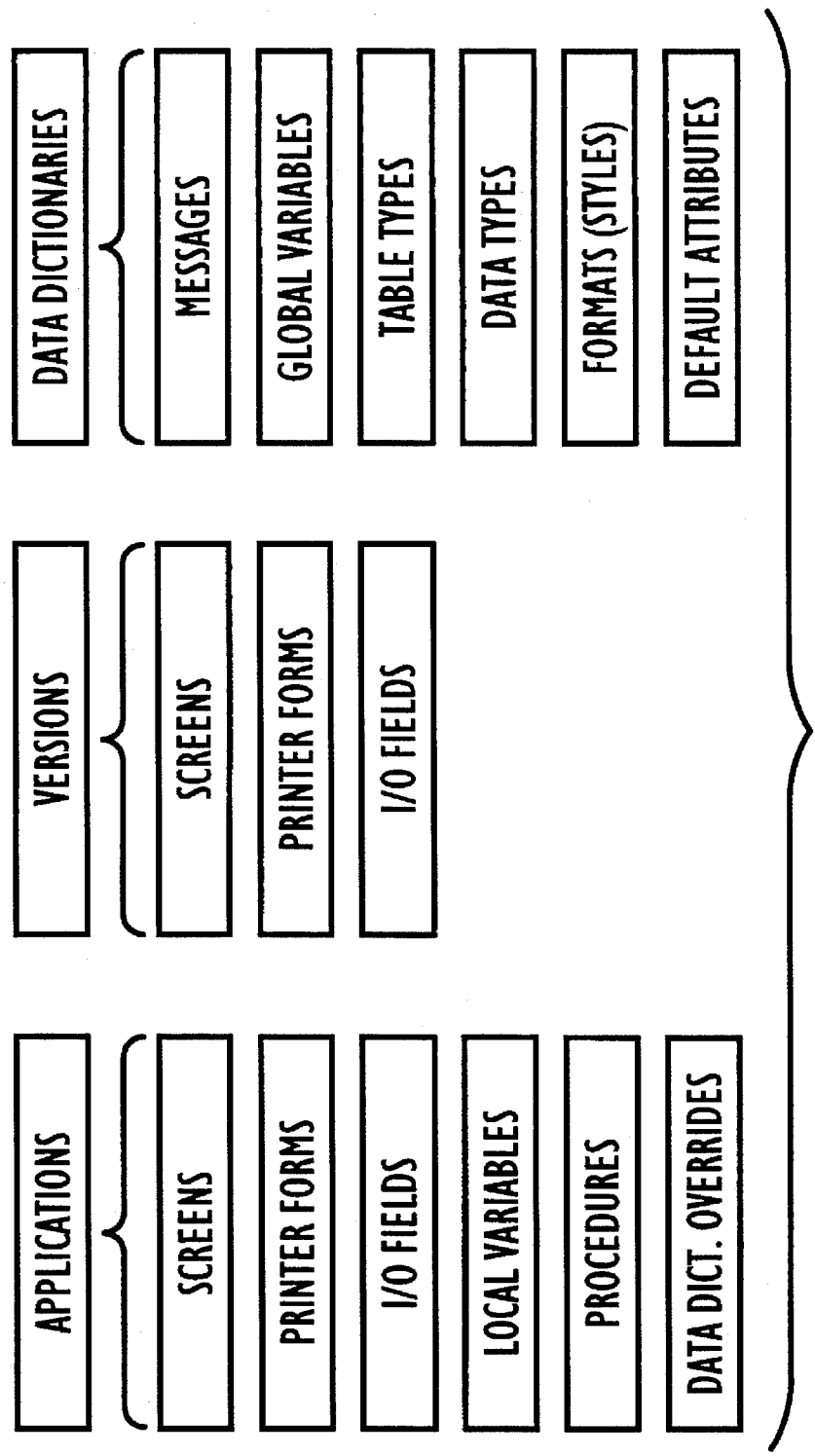

Referring now to FIG. 16, the contents of the application database 520 are illustrated schematically.

In FIG. 16, certain essential components of the applications program are illustrated beneath the left column heading. The screens for display on the target computer's user terminal are a part of the applications programs. Also, printer forms, such as receipts for automatic teller machines, are a part of the applications program. Input/output (I/O) fields are also defined in the application program and are used for such purposes as defining the type and format of information in requests for information to a terminal. The applications program also includes "local" variables, as distinguished from the global variables which are in the dam dictionaries (right side of FIG. 15; see also element 538 in FIG. 14). The applications program include the "procedures", namely the code governing operation of the target computer.

Also, the applications programs includes a provision for overriding settings within the data dictionary 538. Data dictionary overrides are useful in some international finance applications, such as for placing a ".00" after a numeral representing Japanese yen (purposely made different than accepted representations of yen, for a particular display).

Also illustrated in FIG. 16 is a middle column representative of different "versions" of the same applications program. In a preferred embodiment, involving banking in different countries having different languages, the applications program (left column in FIG. 16) is considered the "main version", and any versions designed for use by customers using languages other than English are considered supplemental "versions". As shown in FIG. 16, the screens, printer forms, and I/O fields are specified for each "version". However, the local variables, procedures, and data dictionary overrides do not vary from version to version, because these do not depend on a customer's native language.

Finally, the content of the data dictionaries is illustrated on the right column of FIG. 16. The data dictionary includes a specification of the messages used in the applications program. In a preferred embodiment relating to banking services, these messages are transaction-oriented, and are the messages which pass to and from the hosts to gather information from and send information to the banking customer at an ATM or telephone computer. In the data dictionary, global variables, those used by more than one applications program, are stored. Also, the "table type" definition, used for special variables such as tables and lists, are also present in the data dictionary. Data types, defining how information is stored internally, distinguishes among text, numerical values, stock quotations and the like. I/O formats and Styles relate to display of information, such as the difference between month-day-year format and day-month-year format in different countries. Corresponding to the I/O formats and styles, default attributes are also provided in the data dictionary.

Figure 17:
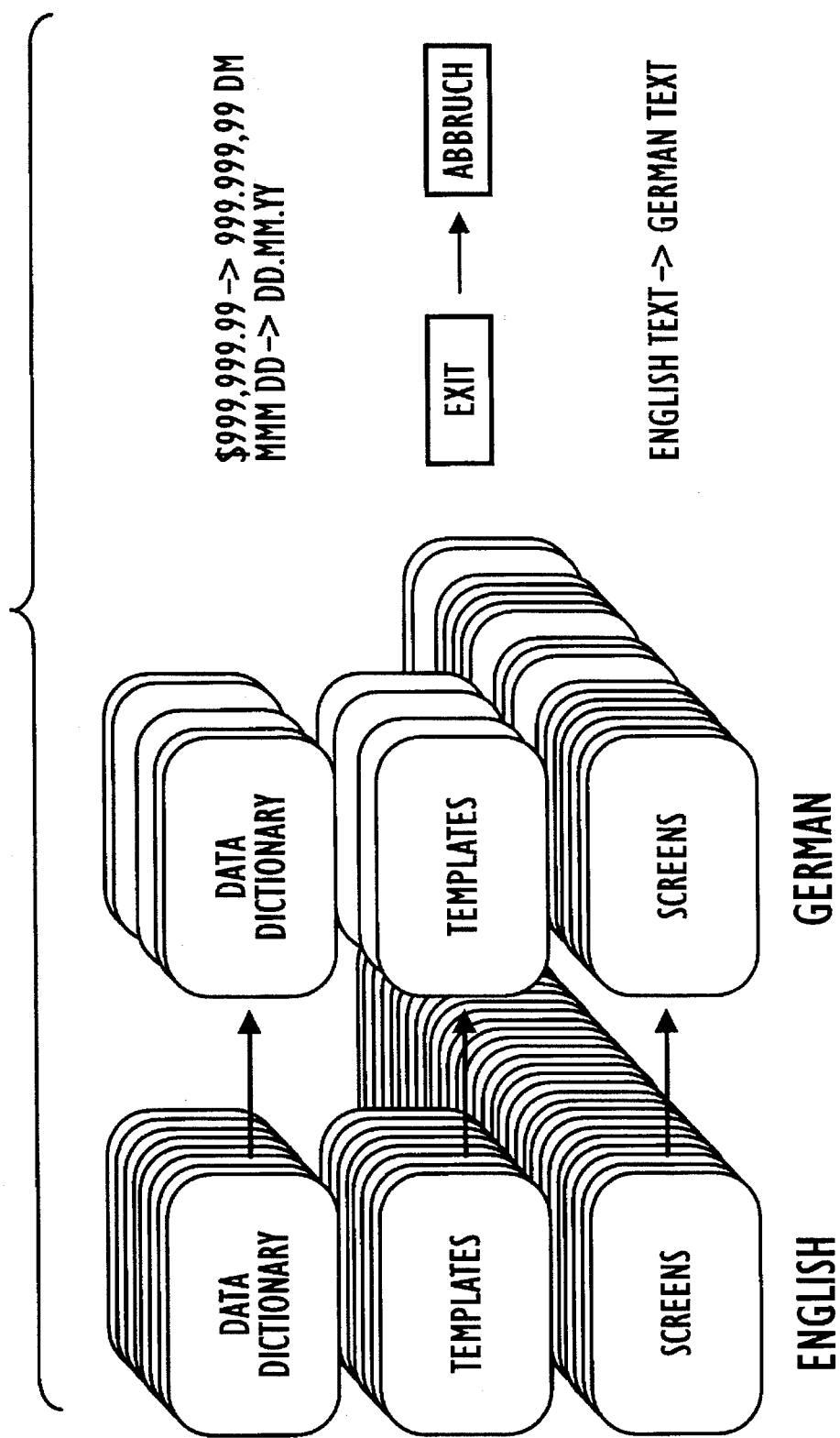

FIG. 17 illustrates how the applications generation system according to the preferred embodiment changes only what needs to be changed, when generating a different "version" for use in a language other than English. In FIG. 17, the example of the difference between a German version of the application program and the "main" (English-language) version of the application program is illustrated. Only certain portions of the data dictionary are different in the German version; other portions remain unchanged. For example, the manner in which currency and dates are represented are different and would thus be different in the two versions. Similarly, any "templates" (those brief labels such as for carrying on automatic teller machine transactions) also must be differently translated. Further, the screens themselves, which contain explanatory text for the customer to use, must be translated differently. However, it is understood that those portions of the applications program which do not have to be changed for different language versions are, in fact, not changed and remain the same for all versions.

Figure 18:
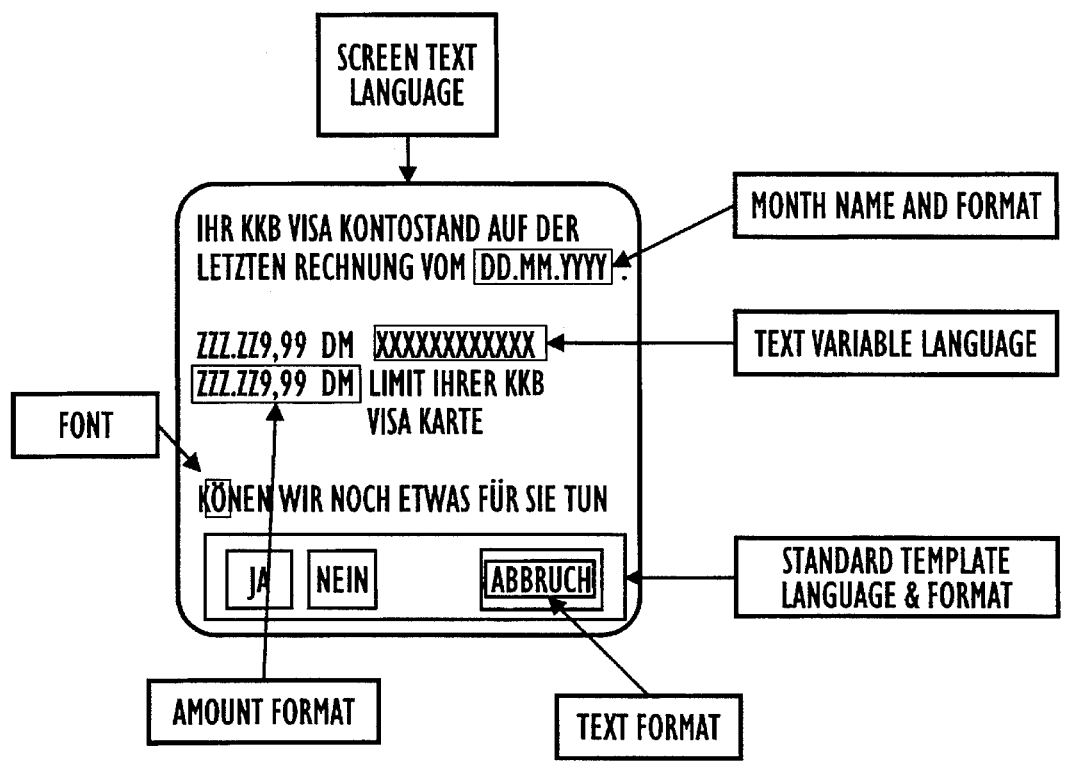

FIG. 18 illustrates a specific example of the different types of fields and formats which vary with the version of the applications program. The screen text language, month name and format, variable language, standard template language and format, text format, currency format, and font are emphasized. According to the preferred embodiment, the choice of language is done by the runtime driver, and any adjustment of date, format, font, and so forth is performed automatically in response to this initial choice.

According to still another feature of the preferred applications generation system, these are provided for testing paths within the applications program, as well as simulating hardware errors. FIG. 19 illustrates a typical hardware simulation screen which is displayed to the applications programmer. In the upper left portion, a simulated keypad for an automatic teller machine is illustrated. In the upper right portion, various hardware devices, such as the cash dispenser or printer of the automatic teller machine, are listed beside corresponding indicators which tell whether the simulation program is treating them as being operational ("up") or broken. In the lower right portion of the display is a "log watch", which is essentially a log of occurrences during a debug session. During development, the programmer can select the status of a variety of devices using the upper right version of the screen, execute applications program code using the debugger, and watch the recorded diagnostic information shown in the lower right portion of the screen. In this manner, the programmer can simulate hardware errors without destroying hardware, while efficiently developing appropriate routines for responding to actual hardware breakdowns in the target computer system.

Finally, it will be recognized by those of skill in the art that while preferred embodiments of the invention has been described in detail, this is not to be considered a limitation on the invention, but merely as exemplary thereof. Other modifications and improvements will be envisioned by those of skill in the art. Similarly, those of skill in the art will recognize that the present disclosure is adequate to enable them to practice the method of the invention as claimed; in particular, the implementation of the network host computer for conversion of the data provided by the home terminal into a protocol suitable for accessing a selected service computer is believed to be well within the skill of the art as of the filing of this application. Thus, modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. A system for enabling a plurality of customers to interact with at least one service provider through a heterogenous plurality of terminals and at least one applications program related to the service provided by the at least one service provider, the system comprising:

a) a heterogenous plurality of terminals;

b) at least one of said terminals consisting of a home terminal having a housing essentially configured as a telephone, said home terminal including:

1) a user input device having means for receiving input from the user and for converting the input into input signals, the input possibly having formatting errors;

2) a packet assembler and disassembler (PAD) element, located within the terminal and in communication with the customer input device, the PAD element including:

i) means for receiving the input signals, for analyzing the input signals in accordance with input formatting rules resident in said PAD which are related to the service provided by the service provider, and for providing local feedback signals in accordance with the analysis; and ii) means, responsive to the input signals, for forming first packets of information in accordance with first formatting rules and a first communications protocol, and for transmitting the first packets of information which have no formatting errors or fewer formatting errors than the input signals;

3) a display including means for receiving the local feedback signals and for displaying them to the customer and for displaying prompts for controlling the operation of the home terminal;

4) means for generating a signal specifying the terminal being used by the user and 5) telephone electronics;

6) computing means;

7) memory;

8) means to electronically connect and control the user input means, display, PAD, signal generating means, telephone electronics, computing means, and memory, to function as both a standard telephone and a microcomputer and;

9) a modem to connect the home terminal to the host computer via a first telephone network;

c) a terminal controller, located remotely from the terminal, and implemented on at least one computing device having means to identify the terminal being used by the user by the signal generated by the terminal and means to execute the applications program, the terminal controller including:

1) a terminal interface controller including means for managing flow of packets of information into and out of the terminal controller in accordance with the first communications protocol compatible with the terminal being used;

2) means for translating the information in the first packets to a second format and a second communications protocol which are compatible with the service provider, so that the applications program forms commands for output to the service provider in accordance with the customer's input;

3) means for receiving information in the second format and the second communications protocol from the service provider;

4) means for translating the information from the second format and the second communications protocol in accordance with the applications program; and 5) means for causing the terminal interface controller to form second packets in accordance with the first formatting rules and the first communications protocol compatible with the terminal being used;

d) the PAD element further includes means for receiving the second packets and for forming signals in response to content of the second packets; and e) the display further constitutes means for displaying the signals to the customer in response to the PAD element, the signals reflecting some of the information received from the service provider.

2. The system of claim 1, wherein the means of the PAD for analyzing the input signals and providing local feedback signals includes:

means for detecting an input which is incompatible with the input formatting rules entered in response to a prompt which has been displayed on the display and means for providing an error signal to the display in response to the detection, as the local feedback signal.

3. The system of claim 1, wherein the means of the PAD for analyzing the input signals and providing local feedback signals includes:

means for determining when an input which is compatible with the input formatting rules has been entered in response to a prompt which has been displayed on the display; and means for providing an echo signal consisting of the compatible input to the display in response to the detection, as the local feedback signal.

4. The system of claim 1, wherein the means of the PAD for analyzing the input signals and providing local feedback signals includes:

means for determining pursuant to the input formatting rules when a confidential input has been entered in response to a confidential code prompt which has been displayed on the display; and means for providing a set of dummy signals which are not descriptive of the confidential input to the display in response to the detection, as the local feedback signal.

5. The system of claim 1, wherein the means for forming the first packets of information include:

means for forming and sequentially transmitting a plurality of first packets in accordance with a sliding window protocol constituting part of the first communications protocol; and means for retransmitting certain packets in response to a "not acknowledge" signal received back from the terminal interface controller.

6. The system of claim 1, wherein:

the PAD and the terminal interface controller each include means for communicating the first packets of information over a telephone network using the first communications protocol.

7. The system of claim 1, wherein:

the applications program is essentially a computer program allowing the customer to interact with any of a plurality of financial service providers to perform financial transactions, inquiries and other related financial services offered by the service provider.

8. The system of claim 2 wherein:

the input formatting rules define formats required to allow the customer to uniquely designate financial quantities and account identification information which respectively correspond to financial quantities and accounts which are governed by the financial service provider.

9. The system of claim 1, wherein:

the PAD element's packet forming and transmitting means constitutes means for emulating an intelligent terminal.

10. A system for enabling a plurality of customers to interact with at least one service provider through a heterogenous plurality of terminals and at least one applications program related to the service provided by the at least one service provider, the system comprising:

a) a heterogenous plurality of terminals;

b) at least one of said terminals consisting of a home terminal having a housing essentially configured as a telephone, said home terminal including:

1) a user input device having means for receiving input from the user and for converting the input into input signals, the input possibly having formatting errors;

2) a display including means for receiving the local feedback signals and for displaying them to the customer and for displaying prompts for controlling the operation of the home terminal;

3) means for generating a signal specifying the terminal being used by the user;

4) telephone electronics;

5) computing means;

6) memory;

7) means to electronically connect and control the user input means, display, PAD, signal generating means, telephone electronics, computing means, and memory, to function as both a standard telephone and a microcomputer and;

8) a modem to connect the home terminal to the host computer via a first telephone network;

c) a terminal controller, located remotely from the terminal, and implemented on at least one computing device having means to identify the terminal being used by the user by the signal generated by the terminal and means to execute the applications program, the terminal controller including:

1) a packet assembler and disassembler (PAD) element, located within the terminal controller and in communication with the customer input device, the PAD element including:

i) means for receiving the input signals, for analyzing the input signals in accordance with input formatting rules resident in said PAD which are related to the service provided by the service provider, and for providing remote feedback signals in accordance with the analysis; and ii) means, responsive to the input signals, for forming first packets of information in accordance with first formatting rules and a first communications protocol, and for transmitting the first packets of information which have no formatting errors or fewer formatting errors than the input signals;

2) a terminal interface controller including means for managing flow of packets of information into and out of the terminal controller in accordance with the first communications protocol compatible with the terminal being used;

3) means for translating the information in the first packets to a second format and a second communications protocol which are compatible with the service provider, so that the applications program forms commands for output to the service provider in accordance with the customer's input;

4) means for receiving information in the second format and the second communications protocol from the service provider;

5) means for translating the information from the second format and the second communications protocol in accordance with the applications program; and 6) means for causing the terminal interface controller to form second packets in accordance with the first formatting rules and the first communications protocol compatible with the terminal being used;

d) the PAD element further includes means for receiving the second packets and for forming signals in response to content of the second packets; and e) the display further constitutes means for displaying the signals to the customer in response to the PAD element, the signals reflecting some of the information received from the service provider.

11. The system of claim 10, wherein the means of the PAD for analyzing the input signals and providing local feedback signals includes:

means for detecting an input which is incompatible with the input formatting rules entered in response to a prompt which has been displayed on the display and means for providing an error signal to the display in response to the detection, as the local feedback signal.

12. The system of claim 10, wherein the means of the PAD for analyzing the input signals and providing local feedback signals includes:

means for determining when an input which is compatible with the input formatting rules has been entered in response to a prompt which has been displayed on the display; and means for providing an echo signal consisting of the compatible input to the display in response to the detection, as the local feedback signal.

13. The system of claim 10, wherein the means of the PAD for analyzing the input signals and providing local feedback signals includes:

means for determining pursuant to the input formatting rules when a confidential input has been entered in response to a confidential code prompt which has been displayed on the display; and means for providing a set of dummy signals which are not descriptive of the confidential input to the display in response to the detection, as the local feedback signal.

14. The system of claim 10, wherein the means for forming the first packets of information include:

means for forming and sequentially transmitting a plurality of first packets in accordance with a sliding window protocol constituting part of the first communications protocol; and means for retransmitting certain packets in response to a "not acknowledge" signal received back from the terminal interface controller.

15. The system of claim 10, wherein:

the applications program is essentially a computer program allowing the customer to interact with any of a plurality of financial service providers to perform financial transactions, inquiries and other related financial services offered by the service provider.

16. The system of claim 15 wherein:

the input formatting rules define formats required to allow the customer to uniquely designate financial quantities and account identification information which respectively correspond to financial quantities and accounts which are governed by the financial service provider.

17. The system of claim 10, wherein:

the PAD element's packet forming and transmitting means constitutes means for emulating an intelligent terminal.

18. A system for enabling a plurality of customers to interact with at least one service provider through a heterogenous plurality of terminals and at least one applications program related to the service provided by the at least one service provider, the system comprising:

a) a heterogenous plurality of terminals;
b) at least one of said terminals consisting of a home terminal having a housing essentially configured as a telephone, said home terminal including:
1) a user input device having means for receiving input from the user and for converting the input into input signals, the input possibly having formatting errors;
3) a display including means for receiving the local feedback signals and for displaying them to the customer and for displaying prompts for controlling the operation of the home terminal;
4) means for generating messages specifying the terminal being used by the user and the service provider with which the user wishes to interact and the version of the applications program corresponding to that service provider resident in the terminal and
5) telephone electronics;
6) computing means;
7) memory;
8) means to electronically connect and control the user input means, display, signal generating means, telephone electronics, computing means, and memory, to function as both a standard telephone and a microcomputer and;
9) a modem to connect the home terminal to the host computer via a first telephone network;
c) a terminal controller, located remotely from the terminal, and implemented on at least one computing device having means to identify the terminal being used by the user by the signal generated by the terminal and means to execute the applications program, the terminal controller including:
1) a terminal interface controller including means for managing flow of information into and out of the terminal controller in accordance with the first communications protocol compatible with the terminal being used;
2) means for translating the information to a second format and a second communications protocol which are compatible with the service provider, so that the applications program forms commands for output to the service provider in accordance with the customer's input;
3) means for receiving information in the second format and the second communications protocol from the service provider;

4) means for translating the information from the second format and the second communications protocol in accordance with the applications program; and
5) means for causing the terminal interface controller to format the information in accordance with the first formatting rules and the first communications protocol compatible with the terminal being used;
d) the terminal further includes means for receiving the information and for forming signals in response to content of the second packets; and
e) the display further constitutes means for displaying the signals to the customer in response to the information, the signals reflecting some of the information received from the service provider;
f) the terminal controller further having:
1) in storage current versions of the applications programs corresponding to the various service providers and the heterogenous plurality of terminals on the system;
2) means for identifying the version of the applications program resident in the terminal corresponding to the service provider selected by the user by the signal sent by the terminal;
3) means to determine whether the applications program in the terminal is the current version;
4) means to download to the terminal the necessary portions of the current version of the applications program so that said version of the applications program corresponding to the selected service provider and the user terminal is the current version; and
g) the terminal further including means to receive the necessary portions of the current version of the applications program and revise the version of the applications program resident in the terminal so that the applications program in the user terminal is the most current for the at least one service provider selected by the user.

19. The system of claim 18, wherein the means for analyzing the input signals and providing local feedback signals includes:

means for detecting an input which is incompatible with the input formatting rules entered in response to a prompt which has been displayed on the display; and means for providing an error signal to the display in response to the detection, as the local feedback signal.

20. The system of claim 18, wherein the means for analyzing the input signals and providing local feedback signals includes:

means for determining when an input which is compatible with the input formatting rules has been entered in response to a prompt which has been displayed on the display; and means for providing an echo signal consisting of the compatible input to the display in response to the detection, as the local feedback signal.

21. The system of claim 18, wherein the means for analyzing the input signals and providing local feedback signals includes:

means for determining pursuant to the input formatting rules when a confidential input has been entered in response to a confidential code prompt which has been displayed on the display; and means for providing a set of dummy signals which are not descriptive of the confidential input to the display in response to the detection, as the local feedback signal.

22. The system of claim 18, wherein:

the applications program is essentially a computer program allowing the customer to interact with any of a plurality of financial service providers to perform financial transactions, inquiries and other related financial services offered by the service provider.

* * * * *